United States Patent
Ariga et al.

(10) Patent No.: US 6,803,443 B1
(45) Date of Patent: Oct. 12, 2004

(54) IMPACT MODIFIER AND POLYESTER COMPOSITION CONTAINING THE MODIFIER

(75) Inventors: Toshirou Ariga, Sakura (JP); Katsuji Takahashi, Sakura (JP); Masao Kamikura, Sakura (JP); Shouji Imamura, Sakura (JP); Takashi Mihara, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/926,576

(22) PCT Filed: Mar. 21, 2001

(86) PCT No.: PCT/JP01/02212

§ 371 (c)(1),
(2), (4) Date: Nov. 20, 2001

(87) PCT Pub. No.: WO01/70846

PCT Pub. Date: Sep. 27, 2001

(30) Foreign Application Priority Data

Mar. 22, 2000 (JP) ........................................ 2000-080020

(51) Int. Cl.⁷ ............................. C08J 3/00; C08K 5/09; C08L 51/00; C08F 20/00; C08G 63/08
(52) U.S. Cl. ........................ 528/354; 524/306; 524/308; 524/310; 524/311; 524/314; 524/320; 525/437; 525/440; 525/444; 528/359
(58) Field of Search ............................... 524/320, 306, 524/308, 310, 311, 314; 525/437, 440, 444; 528/354, 359

(56) References Cited

U.S. PATENT DOCUMENTS

| | | | |
|---|---|---|---|
| 1,995,970 A | | 3/1935 | Dorough |
| 3,498,957 A | | 3/1970 | Jacobson |
| 5,180,765 A | | 1/1993 | Sinclair |
| 5,525,671 A | * | 6/1996 | Ebato et al. |
| 5,616,657 A | * | 4/1997 | Imamura et al. |
| 5,844,066 A | * | 12/1998 | Kakizawa |
| 6,114,495 A | * | 9/2000 | Kolstad et al. |

FOREIGN PATENT DOCUMENTS

| | | |
|---|---|---|
| EP | 0 226 061 | 6/1987 |
| EP | 0 618 250 | 10/1994 |
| JP | 2-117 | 1/1990 |
| JP | 4-335060 | 11/1992 |
| JP | 8-199052 | 8/1996 |
| JP | 8-283557 | 10/1996 |
| JP | 9-137047 | 5/1997 |

* cited by examiner

Primary Examiner—Patrick D. Niland
(74) Attorney, Agent, or Firm—Armstrong, Kratz, Quintos, Hanson & Brooks, LLP

(57) ABSTRACT

A lactic acid polyester (III), having a lactic acid unit (I) and a polyester unit (II) at a weight ratio within the range of 10:90 to 90:10, a weight average molecular weight of 10,000 or more, and a glass transition temperature of 60° C. or below, imparts superior impact resistance to polyhydroxy carboxylic acids while maintaining superior flexibility and transparency and with minimal occurrence of bleedout.

11 Claims, No Drawings

IMPACT MODIFIER AND POLYESTER COMPOSITION CONTAINING THE MODIFIER

TECHNICAL FIELD

The present invention relates to an agent imparting impact resistance that imparts superior impact resistance to polylactic acid and other polyhydroxy carboxylic acids, and a polyhydroxy carboxylic acid having superior impact resistance that contains the agent.

BACKGROUND ART

Although polylactic acid and other polyhydroxy carboxylic acids are polymers that have biodegradability and moldability, polylactic acid and polyhydroxybutyrate in particular have problems in terms of being excessively brittle and difficult to form, thereby limiting their industrial applications.

Various studies have been conducted in order to improve the brittleness of polylactic acid, and the addition of plasticizer in particular is known as a typical polymer modification method. This method has been examined early on as a method for giving flexibility without impairing transparency.

As an example of a plasticizer for polylactic acid, a method is disclosed in U.S. Pat. No. 1,995,970 for increasing flexibility and tear strength by adding dibutylphthalate and nitrocellulose to polylactic acid. U.S. Pat. No. 3,498,957 discloses a plasticizer used when melting that lowers the viscosity of polylactic acid during polymerization by adding glycol diester and dibasic acid diester during polymerization.

U.S. Pat. No. 5,180,765 discloses a method for softening polylactic acid by adding lactic acid oligomer and lactide to polylactic acid. This method, however, is known to have problems such as increased susceptibility to decreased heat resistance and hydrolysis of the polymer itself.

European Patent No. 226061 discloses a polylactic acid composition containing a plasticizer such as triethyl citrate as an application to medical materials.

In addition, Japanese Unexamined Patent Application, First Publication No. 2-117 discloses a polylactic acid composition that contains ester acetate as a plasticizer that is useful as a plasticizing technology of biomaterials such as medical films and rods for implanting in the body.

Japanese Unexamined Patent Application, First Publication No. 4-335060 discloses a composition containing polylactic acid and a plasticizer, and more particularly, a polylactic acid composition containing a general-purpose plasticizer for ordinary general-purpose resins such as phthalic acid ester, aliphatic dibasic acid ester, phosphate, hydroxy polyvalent carboxylate, fatty acid ester, polyvalent alcohol ester, epoxy plasticizer, and polyester plasticizer, or a mixture thereof.

Although polylactic acid can be softened with these techniques, the heat resistance of the plasticized polylactic acid considerably decreases, and although it is soft, it still has numerous shortcomings including the absence of impact strength, cracking during bending and a decrease in the molecular weight of the polylactic acid during kneading. In addition, vaporization of the plasticizer during processing and the problem of bleedout cannot be avoided in the case of these low molecular weight plasticizers.

In addition, polyester plasticizers have difficulty in obtaining adequate flexibility, and suffer from considerable bleedout during storage. Other high molecular weight plasticizers have also been reported, including polyesters such as polycaprolactone and polyethers. Japanese Unexamined Patent Application, First Publication No. 8-199052 discloses that polyethers are useful as plasticizers of polylactic acid, while Japanese Unexamined Patent Application, First Publication No. 8-283557 discloses that an aliphatic polyester composed of aliphatic carboxylic acid and aliphatic diol is useful as a plasticizer used for the purpose of softening polymers consisting primarily of polylactic acid.

In all of these cases, however, the amount that can be added is only able to slightly improve the impact strength of the polylactic acid, and when an attempt is made to increase softness considerably, it causes a decrease in the heat-resistant temperature and bleedout in the same manner as the case of a low molecular weight plasticizer, while transparency also decreases depending on the type and amount of plasticizer added. In addition, although elasticity can be given, there are disadvantages consisting of weakness to impacts and low crazing resistance.

Although Japanese Unexamined Patent Application, First Publication, No. 9-137047 discloses a polylactic acid composition in which polyester having a low melting point is copolymerized to polylactic acid followed by the addition of copolymer or homopolymer having a structure similar to the copolymer, the resulting composition does not allow the obtaining of large impact strength.

In addition, even if the melting point is 100° C. or lower, aliphatic polyester having a high degree of crystallinity and high Tg exhibits low plasticizing effects and low impact resistance improvement effects even if a plasticizer is added. This suggests impact strength does not always result in improved impact strength of polyhydroxy carboxylic acids such as polylactic acid simply because of a similar melting point of additives or similar structure with the base polymer.

The problem to be solved by the present invention is to provide an agent imparting impact resistance that is able to provide impact resistance while being resistant to bleedout and maintaining superior flexibility and transparency, in particular, to provide an agent imparting impact resistance which is useful for polyhydroxy carboxylic acids. In addition, another problem to be solved by the present invention is to provide a polyester composition having superior impact resistance while being resistant to the occurrence of bleedout and maintaining superior flexibility and transparency, as well as provide a molded article using the composition.

DISCLOSURE OF THE INVENTION

As a result of earnest research conducted to solve the above problems, the inventors of the present invention found that a lactic acid polyester (III) having a lactic acid unit (I) and polyester unit (II) at a weight ratio within the range of 10:90 to 90:10, a weight average molecular weight of 10,000 or more, and a glass transition temperature of 60° C. or below is able to impart impact resistance to polyhydroxy carboxylic acids while being resistant to bleedout and maintaining superior flexibility and transparency, thereby leading to completion of the present invention.

Namely, in order to solve the above problems, the present invention provides an agent imparting impact resistance (IV) for polyhydroxy carboxylic acids comprising a lactic acid polyester (III) having a lactic acid unit (I) and polyester unit (II) at a weight ratio within the range of 10:90 to 90:10, a weight average molecular weight of 10,000 or more, and a glass transition temperature of 60° C. or below.

In addition, in order to solve the above problems, the present invention provides a polyester composition (VI) containing a polyhydroxy carboxylic acid (V) and an agent imparting impact resistance, the agent imparting impact resistance comprising a lactic acid polyester (III) having a lactic acid unit (I) and polyester unit (II) at a weight ratio within the range of 10:90 to 90:10, a weight average molecular weight of 10,000 or more, and a glass transition temperature of 60° C. or below.

Moreover, in order to solve the above problems, the present invention provides a molded article composed of the above polyester composition (VI).

Moreover, in order to solve the above problems, the present invention provides a film composed of the above polyester composition (VI).

BEST MODE FOR CARRYING OUT THE INVENTION

The following provides an explanation of the agent imparting impact resistance (IV) of the present invention.

In the present invention, "agent imparting impact resistance" refers to an additive that is able to impart impact resistance by adding to a resin. The agent imparting impact resistance of the present invention is an additive that is able to impart impact resistance and flexibility by adding to a polyhydroxy carboxylic acid (V). In addition, the lactic acid unit (I) refers to a chemical structural unit composed of a lactic acid component (I') to be described later, while the polyester unit (II) similarly refers to a structural unit composed of a polyester component (II') consisting of a dicarboxylic acid (A) and diol (B).

The lactic acid polyester (III) that composes the agent imparting impact resistance (IV) of the present invention can be produced by reacting lactic acid component (I'), selected from a group consisting of, for example, lactic acid, lactide, polylactic acid and polylactide, with polyester (II), comprised of dicarboxylic acid (A) and diol (B), at a weight ratio within the range of 10:90 to 90:10.

At that time, the types of dicarboxylic acid (A) and diol (B) should be selected, and the usage ratio and reaction conditions should be adjusted, so that the weight average molecular weight of lactic acid polyester (III) is 10,000 or more and its glass transition temperature is 60° C. or lower.

The usage ratio of lactic acid component (I') and polyester component (II') is preferably within the range of a weight ratio of 10:90 to 90:10, more preferably within the range of 40:60 to 60:40, even more preferably within the range of 50:50 to 90:10, and particularly preferably within the range of 50:50 to 85:15.

Examples of lactic acid component (I') include lactic acid, lactide, polylactic acid and polylactide. Lactides are compounds in which two molecules of lactic acid are formed into a cyclic dimer. They are monomers having a stereoisomer, examples of which include L-lactide composed of two L-lactic acid molecules, D-lactide composed of two D-lactic acid molecules, and meso-lactide composed of one D-lactic acid and one L-lactic acid molecule.

Copolymers containing only L-lactide or D-lactide crystallize and have a high melting point. Thus, by combining three types of lactides in various ratios according to the application, the characteristics of lactic acid polyester (III) can be adjusted. For example, if the L/D ratio or D/L ratio is within the range of a weight ratio of 100/0 to 90/10, since both the resulting glass transition temperature and melting point are high, more superior impact resistance can be imparted while maintaining heat resistance.

L-lactic acid or D-lactic acid is typically commercially available as 80–90% aqueous solutions. In the present invention, a commercially available lactic acid aqueous solution can be directly used. In the same manner as lactide, the melting point, melt viscosity, and various other properties of lactic acid polyester (III) can be adjusted by changing the composite ratio of L- and D-lactic acid.

Polylactic acid or lactide is preferably used as raw material for lactic acid component (I'). In the case of using polylactic acid or lactide as raw material, the resulting lactic acid polyester (III) is a block copolymer, and is able to impart superior impact resistance while maintaining superior transparency and/or improving suppression of bleedout.

Polyester component (II') is obtained by esterification of dicarboxylic acid (A) and diol (B).

Examples of dicarboxylic acid (A) include aliphatic dicarboxylic acids such as succinic acid, glutaric acid, adipic acid, pimelic acid, suberic acid, azelaic acid, sebacic acid, decanedicarboxylic acid, cyclohexanedicarboxylic acid, and dimeric acid; unsaturated aliphatic dicarboxylic acids such as fimaric acid; aromatic dicarboxylic acids such as phthalic acid, terephthalic acid, isophthalic acid, and naphthalenedicarboxylic acid, and other dicarboxylic acids (A1) having 4–45 carbon atoms. Dicarboxylic acid (A) is not limited to these. In addition, two or more types of these dicarboxylic acids may be used in combination.

Among these dicarboxylic acids (A), dicarboxylic acids having 4–12 carbon atoms that may an unsaturated bond or dicarboxylic acids having 20–45 carbon atoms that may have an unsaturated bond are preferable, examples of which include succinic acid, adipic acid, sebacic acid, decanedicarboxylic acid, cyclohexanedicarboxylic acid, phthalic acid, terephthalic acid, isophthalic acid, dimeric acid, and hydrogenated dimeric acid. Moreover, among these, dimeric acids having 20–45 carbon atoms are particularly preferable since a polyester composition having superior transparency and superior impact resistance can be supplied in the case of adding lactic acid polyester (III) derived from polyester component (II') that uses this compound to polyhydroxy carboxylic acid (V).

Although the dimeric acid can be used without any particular limitations as long as it is a dicarboxylic acid having 24 or more carbon atoms that is formed by a heated dimerization reaction of unsaturated fatty acids each having 12 or more carbon atoms, the oleic acid and tall oil fatty acid used as the starting materials preferably have low toxicity. Although various mechanisms have been proposed for the reaction mechanism of the heated dimerization reaction, dimeric acids containing an alicyclic structure in their molecule, for which a Diels-Alder cyclization reaction induced by heating is thought to be the main mechanism, are used more preferably in the present invention.

These dimeric acids include those having an unsaturated double bond in their molecule, and fatty acids that have been saturated by hydrogenation. Either unsaturated or saturated dimeric acids can be used as the raw material used to synthesize agent imparting impact resistance (IV) composed of lactic acid polyester (III) of the present invention.

Examples of commercially available dimeric acids include dimers of aliphatic unsaturated carboxylic acids having 18 carbon atoms ("EMPOL 1061" and"EMPOL 1062" manufactured by Cognis Japan, Ltd.) and dimers of aliphatic saturated dimeric acids having carbon atoms ("EMPOL 1008" manufactured by Cognis Japan, Ltd.). Although many of these commercially available dimeric acids contain slight amounts of monomeric acids and trimeric acids, such dimeric acids are satisfactory. The purity of the dimeric acid is preferably 90% or more, and more preferably 95% or more. All dimeric acid components are preferably those which are non-toxic as the components are allowed to be used in food wrapping materials.

The usage ratio of dicarboxylic acid (A) component is preferably 10 parts by weight or more, and more preferably 30 parts by weight or more, to 100 parts by weight of the constituent components of polyester component (II'). Furthermore, since polyester that uses an aromatic dicarboxylic acid tends to have a higher glass transition temperature (Tg), in the case of using an aromatic dicarboxylic acid, it is preferable to select an amount and kind to a degree that does not impair the function of the agent imparting impact resistance (IV). The ratio of aliphatic dicarboxylic acid to the total amount of dicarboxylic acid (A) component is preferably within the range of 30 to 100% by weight.

Examples of diol (B) include aliphatic diols (B ) having 2–45 carbon atoms such as ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanedimethanol, propylene glycol, 1,3-butanediol, 1,2-butanediol, neopentyl glycol, 3,3-diethyl-1,3-propanediol, 3,3-dibutyl-1,3-propanediol, 1,2-butanediol, 1,2-pentanediol, 1,3-pentanediol, 2,3-pentanediol, 2,4-pentanediol, 2-methyl-2,4-pentanediol, 1,4-pentanediol, 1,2-hexanediol, 1,3-hexanediol, 1,4-hexanediol, 1,5-hexanediol, n-butoxyethylene glycol, cyclohexanedimethanol, hydrogenated bisphenol A, dimer diol, diethylene glycol, dipropylene glycol, triethylene glycol, polyethylene glycol, polypropylene glycol, polytetramethylene glycol, xylilene glycol, and phenylethylene glycol. Two or more types of these diols may also be used in combination.

Among these diols, aliphatic diols having 2–45 carbon atoms that may have an unsaturated bond are preferable, and furthermore, aliphatic diols having 2–12 carbon atoms that may have an unsaturated bond, or aliphatic diols having 20–45 carbon atoms that may have an unsaturated bond, are particularly preferable. Moreover, among these, dimer diols having 20–45 carbon atoms are particularly preferable since they are able to provide a polyester composition having superior transparency and superior impact resistance in the case of adding lactic acid polyester (III) derived from polyester component (II') that uses a dimer diol having 20–45 carbon atoms to polyhydroxy carboxylic acid (V).

Dimer diols are diols obtained by reducing dimeric acid that preferably have 20–45 carbon atoms, and more preferable examples include the reduced forms of dimers of aliphatic unsaturated carboxylic acids having 18 carbon atoms and dimer diols having 36 carbon atoms. The purity of the dimer diol is preferably 90% or more, and more preferably 95% or more. Dimeric acid and dimer diol may each be used alone, or both may be used in combination. Examples of commercially available dimer diols include the dimer diol having 36 carbon atoms manufactured by TOA-GOSEI CO., LTD. formed by reducing a dimer of aliphatic unsaturated carboxylic acid having 18 carbon atoms.

The ratio of aliphatic diol (B1) to the total amount of diol (B) component is preferably within the range of 30 to 100% by weight. In addition, the usage ratio of diol (B) component is preferably 10 parts by weight or more, and more preferably 30 parts by weight or more, to 100 parts by weight of the constituent components of polyester (II').

Polyester component (II') may be a liquid or a solid, as the melting point and pour point decrease as the composite ratio of dimeric acid, dimer diol, propylene glycol having a side chain, 1,3-butanediol, and the like increases, the modulus of elasticity of lactic acid polyester (III) having polyester component (II') composed of these as raw material becomes lower. Lactic acid polyester (III) can impart more superior impact resistance to the polyhydroxy carboxylic acid, therefore, lactic acid polyester (III) is preferable.

Although there are no particular restrictions on the weight average molecular weight of polyester component (II') obtained by esterification of dicarboxylic acid (A) and diol (B), it is preferably 2,000 or more, more preferably 5,000 or more, even more preferably within the range of 10,000 to 200,000, still more preferably within the range of 20,000 to 150,000, and particularly preferably within the range of 20,000 to 100,000.

High molecular weight polyester component (II') having a molecular weight of 100,000 or more can be produced by reacting acid anhydride or polyisocyanate as a chain extender with the polyester obtained by esterification of dicarboxylic acid (A) and diol (B). The polyester component (II') used in the present invention thus includes polyisocyanate modified polyester obtained by using polyisocyanate as chain extender.

The production method of polyester component (II') comprises the following steps. Dicarboxylic acid (A) and diol (B) are stirred in a molar ratio of 1:1 to 1:5 in a nitrogen atmosphere within a temperature range of 130–240° C. during gradually heating at the rate of 5–10° C. per hour followed by distilling off the water. After reacting for 4–12 hours, the excess diol is distilled off during gradually raising the vacuum from 90 to 0.1 KPa. After reducing the pressure for 2–3 hours, transesterification catalyst and antioxidant are added followed by reacting for 4–12 hours at 200–240° C. during reducing the pressure to 0.5 KPa or lower to obtain polyester component (II') having high viscousity.

In order to reduce coloring that causes a problem during transesterification, preferably, transesterification is carried out using a metal catalyst such as Ti, Sn, Zn, Mg, Al, Zr, and Hf at 10–1000 ppm relative to the amount of polyester, and an antioxidant such as a phosphite compound is added at 10–1000 ppm.

Examples of metal catalysts include titanium tetraisopropoxide, titanium tetrabutoxide, titanium oxyacetylacetonate, tin octanoate, tin 2-ethylhexanoate, zinc acetylacetonate, zinc acetate, magnesium acetate zirconium tetrachloride, hafnium tetrachloride, and hafnium tetrachloride THF complex.

In order to further reduce the melt viscosity, the molecular weight of the polyester obtained by the above production method can be increased by using the polyester having branched chain or by further reacting the polyester with acid anhydride, polyvalent isocyanate, or the like using known methods.

Namely, high molecular weight polyester component (II') can be produced by adding acid anhydride or polyvalent isocyanate to polyester at 180–210° C. and reacting for 3 hours during reducing pressure within the range of 0.5–1 KPa in the case of carboxylic anhydride, or reacting for 3 hours at normal pressure in the case of polyvalent isocyanate. Lactic acid polyester component (III) obtained by reacting the high molecular weight polyester component (II') obtained in this manner and lactic acid component (I') can then be used as the agent imparting impact resistance of the present invention.

The acid anhydride used in the reaction for increasing the molecular weight of the polyester is a carboxylic anhydride of a compound having two or more carboxyl groups in its molecule. Examples of such carboxylic anhydrides include succinic anhydride, cyclohexane dicarboxylic anhydride, phthalic anhydride, maleic anhydride, trimellitic anhydride, and pyromellitic dianhydride. Two or more types of carboxylic anhydrides can be used in combination.

The polyvalent isocyanate used in the reaction for increasing the molecular weight of the polyester is a compound having two or more isocyanate groups in its molecule. The polyvalent isocyanate is preferably bifunctional in the case it is the object to obtain that in which the resulting urethane bond-containing polyester essentially has a linear structure.

Examples of bifunctional isocyanates include hexamethylene diisocyanate, tolylene 2,4-diisocyanate, tolylene 2,5-diisocyanate, toluenediisocyanate, xylylenediisocyanate, diphenylmethane diisocyanate, 1,5-naphthylene diisocyanate, isophorone diisocyanate, and hydrogenated diphenylmethane diisocyanate. Two or more types of these bifunctional isocyanates can be used in combination.

Moreover, trifunctional or more isocyanates can also be used for the polyvalent isocyanate. In this case, the resulting polymer chain has a star shape. In order to obtain such a polymer, a compound is used in which a polyvalent alcohol is modified with a bifunctional isocyanate, an example of which is pentaerythritol modified with bifunctional isocyanate.

Several types of polyvalent isocyanates may be used in combination for the polyvalent isocyanate, and a small amount of trifunctional or more isocyanate can be used in combination with bifunctional isocyanate and reacted without gelling to obtain high molecular weight.

The reaction between polyester and carboxylic anhydride or polyvalent isocyanate may be carried out using a method in which carboxylic anhydride or polyvalent isocyanate is mixed into the reaction product immediately following completion of the ester polymerization of dicarboxylic acid (A) and diol (B) followed by stirring for a short time in the melting state, or using a method in which carboxylic anhydride or polyvalent isocyanate is added to the polyester obtained by polymerization followed by melting and mixing.

In the case of using polyvalent isocyanate, a method in which both the polyester and isocyanate are dissolved in a consolute agent followed by heating and reacting is particularly preferable. As a result, polyisocyanate can be uniformly dispersed in the aliphatic polyester. The temperature for mixing and reacting acid anhydride or polyvalent isocyanate with polyester is normally 70–220° C., and preferably 100–190° C.

When reacting polyvalent isocyanate, it is preferable to use an ester polymerization catalyst or urethane catalyst such as N,N-dimethylaniline, tin octanoate, tin 2-ethylhexanoate, tin dibutyldilaurate, and tetraisopropyl titanate. The amount of acid anhydride or polyvalent isocyanate used is preferably 0.01–5% by weight, and more preferably 0.1–1% by weight, to polyester (II').

During synthesizing polyester, entrance of oxygen into the reaction system causes coloring and decomposition. In addition, in the case of using a raw material having unsaturated bonds, the polyester tends to be gel. Consequently, when releasing the vacuum such as during addition of catalyst, it is preferable to replace the inside of the reaction system with nitrogen or another inert gas.

Next, an explanation is provided of lactic acid polyester (III) to be used as the agent imparting impact resistance (IV) of the present invention.

The lactic acid polyester (III) used as the agent imparting impact resistance (IV) of the present invention is a lactic acid polyester obtained by reacting lactic acid component (I') and polyester component (II'), comprised of dicarboxylic acid (A) and diol (B), at a weight ratio of (I'):(III) of 90:10 to 10:90, preferably 60:40 to 10:90, more preferably 50:50 to 10:90, and particularly preferably 50:50 to 15:85.

Lactic acid polyester (III) preferably has a weight average molecular weight of 10,000 or more. Moreover, in order to maintain transparency and/or improve suppression of bleedout, and impart superior impact resistance, weight average molecular weight is preferably within the range of 20,000 to 200,000, more preferably within the range of 30,000 to 200,000, and particularly preferably within the range of 40,000 to 150,000.

Using a lactic acid polyester having a weight average molecular weight of 10,000 or more, in the case of adding the lactic acid polyester to polyhydroxy carboxylic acid, adequate plasticizing effects and impact strength can be imparted, and there is also no decrease in transparency of the, resin composition. On the other hand, although there is no particular upper limit on molecular weight, it is generally 200,000 or less, and preferably 150,000 or less from the viewpoint of ease of use.

The glass transition temperature (Tg) of lactic acid polyester (III) is preferably within the range of –70° C. to 60° C., and particularly preferably within the range of –65° C. to 60° C. Lactic acid polyester (III) to be used as an agent imparting impact resistance of the present invention designed so that the weight average molecular weight is 10,000 or more and the glass transition temperature is 60° C. or lower, has a storage modulus of elasticity (E') at 20° C. of 2.5 gigapascals (GPa) or less, and preferably 0.1 to 2.0 GPa.

Examples of the production method of lactic acid polyester (III) of the present invention include:

(1) reacting lactide and polyester component (II') in the presence of polymerization catalyst;

(2) obtaining a polylactic acid-polyester block copolymer by polycondensing lactic acid to obtain polylactic acid, and then dehydrating and polycondensing the polylactic acid in the presence of polyester component (II'); and, (3) obtaining polylactic acid-polyester block copolymer by melting and kneading polylactic acid obtained from lactic acid or lactide and polyester component (II') in the presence of a transesterification catalyst.

First, an explanation is provided of the copolymerization method of lactide and polyester component (II') described in (1) above. A reaction temperature is 220° C. or below, preferably 200° C. or below, and particularly preferably 180° C. or below in order to preventing coloring and decomposition of the lactide. Furthermore, in order to prevent decomposition and coloring of the lactide, the reaction is preferably carried out under an atmosphere of an inert gas such as nitrogen or argon. In addition, since the presence of moisture in the reaction system is not desirable, it is necessary to adequately dry the aliphatic polyester.

Polyester component (II') and lactide are then mixed and dissolved at 100–220° C. under these conditions. At this time, a non-reactive solvent such as toluene may be used at 1–30 parts by weight, preferably 5–30 parts by weight, and more preferably 15–30 parts by weight, relative to their total weight. Moreover, 50–2,000 ppm of a polymerization catalyst (such as tin octanoate) is added relative to the total amount of polyester component (II') and lactide in the presence of an atmosphere of an inert gas such as nitrogen or argon at 140–220° C. The ratio of polyester component (II') and lactide in terms of their weight ratio is preferably 10:90 to 90:10, more preferably 40:60 to 90:10, still more preferably 50:50 to 90:10, and particularly preferably 50:50 to 85:15.

Any solvent that is typically known as an esterification catalyst or ring-opening polymerization catalyst can be used for the polymerization catalyst to be used, examples of which include alkoxides, acetates, oxides, and chlorides of Sn, Ti, Zr, Zn, Ge, Co, Fe, Al, Mn, and Hf. Among these, tin powder, tin octanoate, tin 2-ethylhexanoate, tin dibutyldilaurate, tetraisopropyl titanate, tetrabutoxy titanate, titanium oxyacetylacetonate, iron (III) acetylacetonate, iron (III) ethoxide, aluminum isopropoxide, and aluminum acetylacetonate are preferable since the reaction is fast.

Next, an explanation is provided of the copolymerization method of lactic acid and polyester component (II') described in (2) above. Lactic acid polyester (III) can be obtained by polycondensing lactic acid by a known method to obtain polylactic acid followed by adding polyester component (II') and carrying out a polycondensation reaction. Various methods have been disclosed for polycondensation of lactic acid, and any polylactic acid obtained by these methods is satisfactory. In the present invention, since effects of imparting impact resistance are observed if the molecular weight of lactic acid polyester (III) is 10,000 or more, the molecular weight of the polylactic acid should be suitably adjusted with the composite ratio of lactic acid component (I) and polyester component (II'), and with the number of terminal groups or molecular weight of polyester component (II') in consideration of the desired molecular weight of lactic acid polyester (III). Furthermore, the higher the molecular weight of the polylactic acid, the shorter the time in which the copolymerization reaction after addition of polyester component (II') allows the obtaining of high molecular weight lactic acid polyester (III), thereby making this preferable.

In addition, a solvent may be used during polycondensation of lactic acid for increasing the molecular weight of the polylactic acid, and by selecting and using a high boiling point solvent that easily boils with water, such as toluene, xylene, anisole, or diphenylether, the solvent boils with water and after removing water with a drying agent and the like, polymerization can be carried out by again returning the solvent to the reaction system. At this time, the use of a polymerization catalyst such as tin powder or other catalyst listed above enables the reaction to be completed in a short time, thereby making this preferable.

When carrying out polycondensation by mixing and heating polylactic acid, obtained from polycondensation of lactic acid, and polyester component (II'), diol and dicarboxylic acid may be further added to adjust the amount of terminal groups relative to the theoretical amount. The reaction conditions during polycondensation are such that the temperature is preferably 220° C. or below to prevent decomposition and coloring of the lactic acid block, and in order to further increase molecular weight, it is preferable to add a polymerization catalyst such as tin powder or tin octanoate as listed above and lower the pressure to 1 KPa or less. Moreover, similar to during the polycondensation reaction of lactic acid, if an azeotropic dehydration polycondensation reaction is carried out using solvent, lactic acid polyester (III) can be obtained having a higher molecular weight, thereby making this preferable.

Next, an explanation is provided of the method of obtaining polylactic acid-polyester block copolymer by melting and kneading polylactic acid obtained from lactic acid or lactide with polyester component (II') in the presence of a transesterification catalyst as described in (3) above. In this method, polylactic acid and polyester component (II') are mixed and heated followed by carrying out a transesterification reaction in the presence of a polymerization catalyst such as tin octanoate as listed above. The reaction conditions are such that the reaction temperature is preferably 220° C. or lower to prevent decomposition and coloring of the lactic acid block, and the reaction is also preferably carried out in an atmosphere of an inert gas such as nitrogen or argon. In addition, since a higher molecular weight of the polylactic acid is preferable for obtaining lactic acid polyester (III) having a higher molecular weight, the weight average molecular weight of the polylactic acid is preferably 50,000 or more, more preferably 100,000 or more, and even more preferably 150,000 or more.

In addition, since lactide is soluble in various solvents, it may be used in each of the above production methods after dissolving using a solvent such as toluene, benzene, xylene, ethylbenzene, tetrahydrofuran, dioxane, diphenylether, and chlorobenzene.

However, it is preferable that the hydroxyl group or carboxyl group on one or both ends of lactic acid polyester (III) of the present invention be blocked with carboxylic acid or alcohol. This is done because there is the risk of the hydroxyl groups or carboxyl groups of lactic acid polyester (III) lowering the molecular weight of the base polymer during blending, and therefore the blocking of the ends of lactic acid polyester (III) used for an agent imparting impact resistance is effective in preventing the decrease in molecular weight. In the case of agents imparting impact resistance using lactic acid polyester (III) having a molecular weight of 10,000 or less in particular, it preferable to block terminal groups since there is a large number of terminal groups.

Moreover, by either extracting and removing the polymerization catalyst by solvent or deactivating the polymerization catalyst by a catalyst deactivator following copolymerization of lactic acid polyester (III), the storage stability of lactic acid polyester (III) can be further improved.

The agent imparting impact resistance (IV) composed of lactic acid polyester (III) of the present invention is particularly useful as an agent imparting impact resistance for polyhydroxy carboxylic acid (V) such as polylactic acid. Namely, agent imparting impact resistance (IV) of the present invention is used to improve the impact resistance of polyhydroxy carboxylic acids by melting and kneading into the polyhydroxy carboxylic acids such as polylactic acid. During this melting and kneading, since there are cases in which the polymerization catalyst remaining in the polyhydroxy carboxylic acid (V) and lactic acid polyester (III) may react in reverse and promote decomposition, in order to prevent this, it is preferable to remove or deactivate the polymerization catalyst used during their production.

Specific examples of methods for removing polymerization catalyst include soaking resin pellets of lactic acid polyester in aqueous methanol/hydrochloric acid solution, acetone/hydrochloric acid solution or a mixed solution thereof, or mixing the lactic acid polyester with the above solutions in the solution state and washing while precipitating out polymer. The use of such methods also makes it possible to simultaneously wash and remove trace amounts of residual monomers, oligomers, and the like.

In addition, the polymerization catalyst can also be deactivated by addition of catalyst deactivator during or after production of lactic acid polyester (III). Although the catalyst deactivator is normally contained in the lactic acid polyester by adhering to polymerization catalyst in the lactic acid polyester in a chelate-like state, it may also be removed by washing with solvent or the like.

Although the amount of catalyst deactivator added varies according to the type of catalyst used when producing lactic acid polyester (III) and reaction conditions, the amount should be adequate to deactivate the polymerization catalyst used, and is added prior to removal or polymer following completion of the lactic acid polyester polymerization reaction or during kneading normally at 0.001 to 10 parts by weight, preferably 0.1 to 5 parts by weight, and more preferably at 0.5 to 3 parts by weight with respect to 1 part by weight of the catalyst used. In addition, the catalyst deactivator may be added to and kneaded into the produced lactic acid polyester.

A chelating agent and/or acidic phosphate is particularly preferable for the catalyst deactivator used in the present invention. There are no particular restrictions on the chelating agent, and examples include ethylenediamine tetaacetatic acid, disodium ethylenediamine tetraacetic acid, oxalic acid, phosphoric acid, pyrophosphoric acid, alizarin, acetyl acetone, diethylenetriamine pentaphosphoric acid, triethylenetetramine hexaacetic acid, catechol, 4-t-butylcatechol, L(+)-tartaric acid, DL-tartaric acid, glycine, chromotropic acid, benzoyl acetone, citric acid, gallic acid, dimercaptopropanol, triethanolamine, cyclohexanediamine tetraacetic acid, ditoloyl tartrate, and dibenzoyl tartrate.

In addition, acidic phosphate esters form complexes with metal ions of the catalyst contained in the polyester comprising hydroxy carboxylic acid, causing the catalyst to be deactivated and exhibiting the effects of inhibiting severing of the polymer chain. Acidic phosphates refer to acidic phosphates, phosphonates, alkylphosphonates, and mixtures thereof.

Examples of acidic phosphate esters include known acidic phosphates, phosphonates, alkylphosphonates, and mixtures thereof as disclosed in, for example, U.S. Pat. No. 5,686,540. The acidic phosphates component has superior workability since it has good solubility with organic solvents, exhibits superior reactivity with lactic acid polyester and imparts superior effects on deactivating polymerization catalyst.

Although there are no particular restrictions on the polymerization conversion rate of the copolymerization reaction in any of the lactic acid polyester (III) production methods described above, it is preferable to achieve a polymerization conversion rate of 90–99% by reacting at 160–180° C. for 1.5 hours or more, preferably 2.5 hours or more, and more preferably for 3 hours or more, while measuring polymerization conversion rate by gel permeation chromatography (GPC).

The lactic acid polyester (III) of the present invention can be produced using an ordinary reaction oven in the case of ring-opening copolymerization, and a CSTR type of production apparatus compatible with its continuous production can be used. With respect to products of higher viscosity, since stirring efficiency decreases in the case of a copolyrnerization reaction using an ordinary reaction oven, there is the risk of coloring and decreased reaction rate due to local heating. In such cases, it is preferable to use a static mixer that provided uniform stirring and low shearing stress.

In addition, although this reaction can be carried out with a static mixer alone, a method in which an ordinary reaction oven is used at the stage of low viscosity, and a static mixer is used prior to the rise in viscosity in the latter stage of polymerization is even more preferable from the viewpoint of uniform mixing of the polymerization initiator.

The viscoelasticity at room temperature of lactic acid polyester (III) is such that it becomes softer the greater the number of carbon atoms of the main chain of the diol that composes the aliphatic polyester used for copolymerization. In addition, it also becomes softer the greater the amount of dicarboxylic acid used in combination with dimeric acid.

Next, an explanation is provided of the polyester composition (VI) that contains the agent imparting impact resistance (IV) and polyhydroxy carboxylic acid (V) of the present invention.

Examples of polyhydroxy carboxylic acid (V) used in the composition of the present invention include polylactic acid, polyglycolic acid, polyhydroxybutyrate, polyhydroxyvalyrate, copolymers of hydroxybutyrate and hydroxyvalyrate, and polycaprolactone. Among these, polylactic acid, polyhydroxybutyrate, and polycaprolactone are preferable, while polylactic acid is particularly preferable. Although there are no particular restrictions on the weight average molecular weight of these polyhydroxy carboxylic acids, in general, the weight average molecular weight is preferably 50,000 or more, more preferably 70,000 or more, and particularly preferably 10,000 or more, but 500,000 or less.

The agent imparting impact resistance (IV) of the present invention may be kneaded directly with a polyhydroxy carboxylic acid such as polylactic acid, or it can be used in the state of a master batch in which it is blended in advance at a high concentration with polyhydroxy carboxylic acid (V).

The kneading ratio of the lactic acid polyester (III) and polyhydroxy carboxylic acid (V) that compose the agent imparting impact resistance (IV) of the present invention should be that which allows the effect of the present invention to be achieved, and the ratio of (III):(V) is preferably 3:97 to 70:30, more preferably 5:95 to 50:50, and particularly preferably 5:95 to 40:60. If the kneading ratio is within this composite ratio, the heat resistance, impact resistance, and bleedout of the blend are improved in the proper balance.

The conditions for kneading the agent imparting impact resistance (IV) and polyhydroxy carboxylic acid (V) are such that they should be kneaded at temperature equal to or higher than the melting point of the polyhydroxy carboxylic acid (V) added. However, since the melting point of the lactic acid polyester that composes the agent imparting impact resistance (IV) of the present invention is 140–170° C., kneading should preferably be carried out at a temperature of 180–200° C. If the temperature is far above 200° C., it is necessary to adjust the kneading time, kneading speed, and the like since molecular weight of the polyhydroxy carboxylic acid (V) decreases.

An extruder, a kneader, a batch kneader, and the like are used as the kneading machine. In addition, in the case of kneading inside the reaction oven or in the case of high viscosity, blending may also be carried out using a static mixer. Although similar blending can be carried out even in the case of wet blending using solvent, when vaporizing the solvent, it is preferable to reduce the pressure at a high temperature and vaporize the solvent in a short period of time to prevent separation of polymer.

The polyester composition (VI) of the present invention can easily be formed into a film by extrusion molding such as T-die cast molding or inflation molding. In addition, multiple layers can also be formed by using a plurality of extruders. Furthermore, although sheets and films are conventionally used in different applications according to their thickness, in the present invention, these are generically referred to as film in the present invention to avoid confusion. Although there are no particular restrictions on thickness of the film of the present invention, typically used film has a thickness of 5 $\mu$m to 2 mm.

Since polyester composition (VI) has high hygroscopicity and is easily hydrolyzed, in the forming of film or other wrapping materials, although forming can be carried out easily with a typical single screw extruder, when a twin screw extruder is used provided with a vent in which water management is important, due to the high dehydration effects, there is no need for preliminary drying and film formation can be carried out efficiently.

The screw should normally be of the full flight type in which the ratio L/D of the length (L) of the kneading portion of the screw to the diameter (D) of the kneading screw is about 20 to 50, and it may also be provided with a vent. When using a single screw extruder, dehumidification and drying are carried out by a vacuum dryer and so forth to avoid hydrolysis inside the extruder, and the moisture content of the raw materials is preferably held to 50 ppm or less. Although the proper extruding temperature varies according to the molecular weight of the polyester composition (VI) used as well as the amount of residual lactide, it is preferably equal to or higher than the flow starting temperature.

Although there are no particular restrictions on the melting temperature when forming the polyester composition (VI) into a film by T-die cast molding, it is normally a temperature that is 10–60° C. higher than the melting point of polyester composition (VI). The molten extruded film is normally cast to a prescribed thickness and cooled as necessary. At that time, a uniform film can be obtained by using a touch roller or air knife in the case the film is excessively thick, or electrostatic pinning in the case it is excessively thin.

The formed film can be oriented uniaxially or biaxially by either using a tenter system or inflation system at a temperature above the glass transition point but below the melting point. As a result of carrying out orientation treatment, molecular orientation is created thereby making it possible to improve impact resistance, rigidity, transparency and other physical properties.

In the case of uniaxial orientation, it is preferable that the film be drawn by a factor of 1.3 to 10 in the vertical or horizontal direction by vertical orientation using the roller method or horizontal orientation using a tenter. In the case of biaxial orientation, vertical orientation can be carried out by the roller method, while horizontal orientation can be carried out using a tenter, and the method may consist of sequentially carrying out orientation of the first axis followed by orientation of the second axis, or orientation of both axes may be carried out simultaneously. It is preferable that the drawing factor be 1.3 to 6 in the vertical direction and horizontal direction, respectively. If the drawing factor is lower than this, it is difficult to obtain a film having sufficiently satisfactory strength, while if the drawing factor is higher than this, the film ends up breaking during orientation, thereby making this undesirable as well. Furthermore, in cases in which shrinkage during heating is required in particular as in the case of shrink film, a higher drawing factor of 3 to 6 for either one or both axes is preferable.

The orientation temperature is preferably within the range of the glass transition temperature (abbreviated as Tg) to (Tg+50)° C. of the lactic acid polyester (III), while a range of Tg to (Tg+30)° C. is particularly preferable. If the orientation temperature is below Tg, orientation becomes difficult, and if the orientation temperature exceeds (Tg+50)° C., there may be no improvements in strength observed resulting from orientation.

In addition, heat setting is carried out immediately after orientation to improve heat resistance, and heat resistance characteristics can also be improved by promoting removal of strain or crystallization.

In addition, if heat setting treatment is carried out while applying tension immediately after orientation in order to improve heat resistance, heat resistance characteristics can also be improved by promtoing removal of strain or crystallization. Although heat setting treatment can be carried out at a temperature starting from a temperature 20° C. lower than the crystallization temperature (Tc) to a temperature below the melting point of lactic acid polymer, if carried out within a range of 70–150° C., and more preferably 90–150° C., not only is heat resistance improved, but tensile elongation and other film properties also improve, thereby making this preferable.

Although the duration of heat setting treatment is normally from 1 second to 30 minutes, since the shorter the duration the better in the case of considering productivity and other parameters affecting practicality, it is preferably from 1 second to 3 minutes, and more preferably from 1 second to 1 minute.

When forming these films, an ordinary filler such as an inorganic filler, examples of which include talc, calcium carbonate, silica, clay, diatomaceous earth or pearlite, or an organic filler, such as wood chips, may be added and mixed.

In addition, the thermal stability during molding of the polyester composition (VI) of the present invention can be improved by using an antioxidant such as 2,6-di-t-butyl4-methylphenol (BHT) or butyl-hydroxyanisol (BRA), an ultraviolet absorber such as salicylic acid derivatives or benzophenone- and benzotriazole-based ultraviolet absorbers, or a stabilizer such as phosphate ester, isocyanate or carbodiimide. Although there are no particular restrictions on the amount of these stabilizers added provided it is within a range that does not impair the effect of the present invention, it is preferably added in the normal amount of 0.1–10% with respect to the weight of polyester composition (VI).

In addition, metallic soaps such as zinc stearate, magnesium stearate, and calcium stearate, lubricants such as mineral oil, liquid paraffin, and ethylene bisstearylamide, nonionic surfactants such as glycerin fatty acid ester and sucrose fatty acid ester, ionic surfactants such as alkylsulfonates, and colorants such as titanium oxide and carbon black may also be added.

In addition, a foam product can be obtained either by adding an inorganic foaming agent such as sodium bicarbonate or ammonium bicarbonate or an organic foaming agent such as azodicarbon amide, azobisisobutyronitrile or sulfonyl hydrazide, or by pre-impregnating the polymer of the present invention or supplying directly to the extruder during the extrusion process a foaming agent such as pentane, butane or fluorohydrocarbon. In addition, the film can be laminated with paper, aluminum foil or other degradable polymer film by extrusion lamination, dry lamination or co-extrusion.

Vacuum molding, compressed air molding or vacuum compressed air molding can be used as secondary processing methods of the film. The formation of a film from the polyester composition (VI) of the present invention can be performed using existing apparatuses used in the production of general-purpose resin films.

In the case of vacuum molding or vacuum compressed air molding, plug assist molding may also be performed. It is preferable to perform compressed air molding for oriented films. Furthermore, heating and cooling of the mold can be arbitrarily used in combination during this molding. In particular, heat resistance performance can be further improved by aggressively promoting crystallization by heating the mold above the crystallization temperature.

During inflation molding, molding can be performed easily with a molding apparatus equipped with an ordinary circular die and air ring, and special ancillary apparatuses are not required. Furthermore, in order to prevent variations in thickness at this time, rotation of the die, air ring or winder may be performed.

With respect to film production, a bag-shaped product can be obtained by easily heat sealing with an ordinary bag-making machine such as a horizontal pillow bag-making machine, vertical pillow bag-making machine or twist-pack bag-making machine.

In order to obtain a processed product other than these films, containers and other molded products can be obtained without problems by using an ordinary injection molding machine.

In addition, blow molding can also be performed easily, and single-layer or multi-layer bottles can be molded easily by using existing molding machines. With respect to press molding as well, single-layer or multi-layer products can be obtained without problems using ordinary molding machines.

The polyester composition (VI) of the present invention demonstrates superior impact resistance by adding agent imparting impact resistance (IV). The polyester composition (VI) of the present invention has an Izod impact strength of 3 $kJ/m^2$ or more, preferably 4–20 $kJ/m^2$, more preferably 6–20 $kJ/m^2$ and particularly preferably 9–20 $kJ/m^2$ using the method described in the examples by adjusting the amount of agent imparting impact resistance of the present invention added. Alternatively, when in the form of a non-oriented film or oriented film, the polyester composition (VI) has a Dupont impact strength of 0.20 J or more, and preferably 0.3–5 J, while in the form of an oriented, heat set film, has film impact strength of 1 J or more, and preferably 1–10 J.

Moreover, the polyester composition (VI) of the present invention also exhibits superior flexibility by adding the agent imparting impact resistance (IV) of the present invention. For example, the storage modulus of elasticity (E') at room temperature when the composition (VI) is molded into a film and measured with the RSAII system made by Rheometric Scientific F.E.Ltd. is within the range of 0.5–3.0 KPa, while an even better example exhibits a value within the range of 0.6–2.4 KPa.

In addition, all of the compositions are superior to low molecular weight plasticizers and ordinary polyester-based plasticizers from the viewpoint that these compositions hold Tg to 50° C. or higher while enhancing impact resistance without causing a decrease in heat resistance of the base polymer.

In addition, the agent imparting impact resistance of the present invention is able to maintain superior transparency even if added to polyhydroxy carboxylic acid (V). For example, the haze value of a pressed film having a thickness of 250 μm in which 30 parts by weight of agent imparting impact resistance are added to 100 parts by weight of polylactic acid is 35% or less, more preferably 1–30%, and even more preferably 1–25%.

When a molded product or film (measuring 10×10 cm square and having a thickness of 250 μm) using polyester composition (VI) containing the agent imparting impact resistance of the present invention was allowed to stand in a constant temperature and constant humidity bath at 35° C. and humidity of 80%, there was no bleeding from the surface of the molded product for 60 days or more.

Moreover, the agent imparting impact resistance (IV) obtained in the present invention as well as polyester composition (VI) containing the agent imparting impact resistance (IV) and polyhydroxy carboxylic acid (V), have satisfactory biodegradability, and even in the case of being discarded in the ocean, are subjected to degradation in the form of hydrolysis and biodegradation. In sea water, their strength as a resin deteriorates in several months, enabling them to be degraded until they no longer retain their shape. In addition, when compost is used, they are biodegraded until they no longer retain their original shape in an even shorter period of time, and even when incinerated, do not discharge toxic gases or toxic substances.

Polyester composition (VI), comprising the agent imparting impact resistance (IV) and polyhydroxy carboxylic acid (V) of the present invention, is useful as various types of molded products, molding resin, material for sheets and films, resin for paints, resin for ink, resin for toner, adhesive resin, medical materials, lamination on paper and foam resin materials, and particularly as wrapping material and adhesive.

Examples of useful wrapping material applications include films such as trays, cups, plates and blister packs, and films such as wrapping film, food packaging, other types of general packaging, garbage bags, grocery store bags, general standard bags, heavy bags and other types of bags.

In addition, other useful applications include blow molded products, examples of which include shampoo bottles, cosmetic bottles, beverage bottles and oil containers, sanitary articles such as disposable diapers and sanitary napkins, medical supplies such as artificial kidneys and suture thread, as well as agricultural materials such as germinating film, seed string, agricultural multi-film, coating agents for slow-acting agricultural chemicals and fertilizers, bird protection nets, cultivating film and seedling pots.

In addition, other useful applications include fishery materials such as fish nets, seaweed cultivation nets, fishing line and boat bottom paint, as well as injected molded products such as golf tees, cotton swab cores, candy sticks, brushes, toothbrushes, syringes, plates, cups, combs, knife handles, tape cassettes, disposal spoons and forks, ball point pens and other stationary products.

In addition, examples of products laminated onto paper include trays, cups, plates and megaphones, as well as binding tape, prepaid cards, balloons, panty stockings, hair caps, sponges, cellophane tape, umbrellas, raincoats, rubber gloves, hair caps, rope, non-woven fabric, tubes, Styrofoam trays, foam cushioning materials, cushioning materials, packaging materials and cigarette filters.

EXAMPLES

Although the following provides a more detailed explanation of the present invention using its examples and comparative examples, the present invention is by no means limited to these examples.

Measurements performed in the examples are as described below.

(Measurement of Molecular Weight)

Molecular weight was measured using a gel permeation chromatography measuring system (abbreviated as GPC, HLC-8020 manufactured by Tosoh Corporation, column temperature: 40° C., tetrahydrofuran solvent) based on comparison with a polystyrene reference sample.

(Thermal Properties)

Thermal properties were measured using a differential scanning calorimeter (abbreviated as DSC, DSC220C manufactured by Seiko Instruments Inc.) over a range of –100 to 200° C. at a temperature rise rate of 10° C./min.

(Storage Modulus of Elasticity (E'): abbreviated as DMA)

Film measuring 200 μm thick by 5 mm wide by 35 mm long was measured by film texture geometry using the RSAII manufactured by Rheometric Scientific F.E. Ltd. under conditions of a chuck interval of 2.4 mm, 6.28 rad and 0–120° C.

(Measurement of Transparency: to be Referred to as Haze)

Film measuring 10×10 cm was cut into pieces measuring 5 cm×5 cm and measured with a turbidimeter (ND-1001DP manufactured by Nippon Denshoku Industries Co. Ltd.,).

(Izod Impact Test: Abbreviated as Izod)

Izod impact strength was measured according to the Izod impact test method in compliance with JIS K 7110. Namnely, after injection molding to an Izod test piece measuring 6 mm wide by 3 mm thick by 31 mm high under conditions of 170–90° C. using a Minimax Molder (CSI), a notch measuring 1.2 mm was formed in the direction of width of the test piece with a notching machine (manufactured by Tecno Supply). Measurement was performed with this notched Izod test piece and an Izod measuring instrument (POE2000, manufacture by GRC).

(Dupont Impact Strength Test)

The 50% destructive energy of the resulting film was determined by dropping a weight of constant weight onto the film while changing the dropping height using the Dupont impact strength measuring method of JIS K 5400. The portion colliding with the film was made of steel and had a smooth hemispheric shape having a diameter of 6.3 mm (manufactured by Ueshima Seisakusho Co., Ltd.).

(Film Impact Test)

Measurement was performed with the method in compliance with ASTMD-3420.

(Proton Nuclear Magnetic Resonance Measurement: abbreviated as $^1$H-NMR)

30 mg of measurement sample was dissolved in 0.5 ml of chloroform-d (CDC13), and the solution was placed in an NMR glass ampule followed by measurement at 25° C. with an $^H$1-NMR instrument (JNM-LA300 manufactured by JEOL Ltd.).

Reference Example 1—Synthesis of Aliphatic Polyester A-1

1 mol equivalent of "Empol 1061" (manufactured by Cognis Japan Ltd., dimeric acid of a dimer of aliphatic unsaturated carboxylic acid having 18 carbons; abbreviated as DA) and 1.4 mol equivalents of propylene glycol (abbreviated as PG) were charged into a 50 L reaction tank equipped with a stirrer, rectifying tube and gas feed tube followed by heating and stirring while raising the temperature at the rate of 10° C. per hour starting at 150° C. in the presence of flowing nitrogen. The temperature was raised to 220° C. while distilling off the formed water and after 2 hours, 70 ppm of transesterification catalyst in the form of titanium tetraisopropoxide were added and the pressure was lowered to 0.1 KPa followed by stirring for 3 hours to obtain aliphatic polyester (A-1) having number average molecular weight (Mn) as determined by polystyrene conversion using GPC of 18,000, and a weight average molecular weight (Mw) of 30,000.

Reference Example 2—Synthesis of Aliphatic Polyester A-2

1 mol equivalent of "Empol 1062" (manufactured by Cognis Japan Ltd., dimeric acid of a dimer of aliphatic unsaturated carboxylic acid having 18 carbons; abbreviated as DAH) and 1.4 mol equivalents of 1,4-butanediol (abbreviated as 1,4 BD) were charged into a 50 L reaction tank equipped with a stirrer, rectifying tube and gas feed tube followed by heating and stirring while raising the temperature at the rate of 10° C. per hour starting at 150° C. in the presence of flowing nitrogen. The temperature was raised to 220° C. while distilling off the formed water and after 2 hours, 70 ppm of transesterification catalyst in the form of titanium tetraisopropoxide were added and the pressure was lowered to 0.1 KPa followed by stirring for 3 hours to obtain aliphatic polyester (A-2) having number average molecular weight (Mn) as determined by polystyrene conversion using GPC of 13,000, and a weight average molecular weight (Mw) of 22,000.

Reference Example 3—Synthesis of Aliphatic Polyester A-3

1 mol equivalent of DA and 1.4 mol equivalents of PG were charged into a 50 L reaction tank equipped with a stirrer, rectifying tube and gas feed tube followed by heating and stirring while raising the temperature at the rate of 7° C. per hour starting at 150° C. in the presence of flowing nitrogen. The temperature was raised to 220° C. while distilling off the formed water followed by stirring for 2 hours to obtain aliphatic polyester (A-3) that was fluid even at room temperature and had a number average molecular weight (Mn) as determined by polystyrene conversion using GPC of 2,000, and a weight average molecular weight (Mw) of 5,000.

Reference Example 4—Synthesis of Aliphatic Polyester A-4

66 parts by weight of DA, 34 parts by weight of 1,6-cyclohexane dicarboxylic acid (manufactured by Eastman Chemical Company, abbreviated as CHDA), 0.9 mol equivalents of ethylene glycol (abbreviated as EG) relative to the mol equivalents of dicarboxylic acid, and 0.55 mol equivalents of 1,6-hexanediol (abbreviated as 1,6 RD) were charged into a 10 L reaction tank equipped with a stirrer, rectifying tube and gas feed tube followed by heating and stirring while raising the temperature at the rate of 7° C. per hour starting at 150° C. in the presence of flowing nitrogen. The temperature was raised to 220° C. while distilling off the formed water and after 2 hours, 50 ppm of transesterification catalyst in the form of tributyl tin oxide were added and the pressure was lowered to 0.1 KPa followed by stirring for 2 hours.

This was then prepared in the form of a 20% solution in toluene followed by the addition of 0.05 parts by weight of hexarnethylene diisocyanate (abbreviated as HMDI). Moreover, 0.01 parts by weight of tin octanoate were added to polyester followed by stirring for 1 hour at 60° C. to obtain aliphatic polyester (A-4) that was consistent, and had a number average molecular weight (Mn) as determined by polystyrene conversion using GPC of 25,000, and a weight average molecular weight (Mw) of 55,000.

Reference Example 5—Synthesis of Aliphatic/Aromatic Polyester A-5

70 parts by weight of CHDA, 30 parts by weight of terephthalic acid (abbreviated as TPA), 0.7 mol equivalents of a dimer diol (manufactured by TOAGOSEI CO., LTD., abbreviated as DDO) of a dimer having 18 carbons relative to the mol equivalents of dicarboxylic acid, and 0.65 mol equivalents of EG were charged into a 500 mL flask equipped with a stirrer, rectifying tube and gas feed tube followed by heating and stirring while raising the temperature at the rate of 10° C. per hour starting at 150° C. in the presence of flowing nitrogen.

The temperature was raised to 220° C. while distilling off the formed water and after 2 hours, 80 ppm of transesterification catalyst in the form of zinc acetate were added and the pressure was lowered to 1 KPa followed by stirring for 1 hour. After reacting, 2 parts by weight of pyromellitic dianhydride (abbreviated as PMDA) were added followed by stirring for 3 hours at 210° C. while reducing the pressure to 5 KPa to obtain aliphatic/aromatic polyester (A-5) having a number average molecular weight (Mn) as determined by polystyrene conversion using GPC of 36,000, and a weight average molecular weight (Mw) 20 of 81,000.

Reference Example 6—Synthesis of Aliphatic Polyester A-6

100 parts by weight of sebacic acid (abbreviated as SeA) and 1.35 mol equivalents of PG relative to the mol equivalents of dicarboxylic acid were charged into a 1 L flask equipped with a stirrer, rectifying tube and gas feed tube followed by heating and stirring while raising the temperature at the rate of 10° C. per hour starting at 150° C. in the presence of flowing nitrogen.

The temperature was raised to 220° C. while distilling off the formed water and after 1 hour, 80 ppm of transesterification catalyst in the form of titanium tetrabutoxide monomer were added and the pressure was lowered to 0.1 KPa followed by stirring for 6 hours to obtain aliphatic polyester (A-6) having a number average molecular weight (Mn) as determined by polystyrene conversion using GPC of 41,000, and a weight average molecular weight (Mw) of 78,000.

Reference Example 7—Synthesis of Aliphatic/Aromatic Polyester A-7

100 parts by weight of SeA and 1.35 mol equivalents of PG relative to the mol equivalents of dicarboxylic acid were charged into a 1 L flask equipped with a stirrer, rectifying tube and gas feed tube followed by heating and stirring while raising the temperature at the rate of 10° C. per hour starting at 150° C. in the presence of flowing nitrogen.

The temperature was raised to 220° C. while distilling off the formed water and after 1 hour, 30 ppm of transesterification catalyst in the form of titanium tetrabutoxide monomer were added. After 3 hours, 50 ppm of titanium tetrabutoxide monomer were added and the pressure was lowered to 0.1 KPa followed by stirring for 12 hours to obtain aromatic/aliphatic polyester (A-7) having a number average molecular weight (Mn) as determined by polystyrene conversion using GPC of 30,000, and a weight average molecular weight (Mw) of 55,000.

Reference Example 8—Synthesis of Aliphatic Polyester A-8

100 parts by weight of SeA and 1.35 mol equivalents of 1,3-butanediol (abbreviated as 1,3BG) relative to the mol equivalents of dicarboxylic acid were charged into a 1 L flask equipped with a stirrer, rectifying tube and gas feed tube followed by heating and stirring while raising the temperature at the rate of 10° C. per hour starting at 1 50° C. in the presence of flowing nitrogen.

The temperature was raised to 220° C. while distilling off the formed water and after 1 hour, 30 ppm of transesterification catalyst in the form of titanium tetrabutoxide monomer were added. After 3 hours, 50 ppm of titanium tetrabutoxide monomer were added and the pressure was lowered to 0.1 KPa followed by stirring for 11 hours to obtain aliphatic polyester (A-8) having a number average molecular weight (Mn) as determined by polystyrene conversion using GPC of 31,000, and a weight average molecular weight (Mw) of 56,000.

Reference Example 9—Synthesis of Aliphatic Polyester A-9

100 parts by weight of adipic acid (abbreviated as AA) and 1.35 mol equivalents of 1,3BG relative to the mol equivalents of dicarboxylic acid were charged into a 1 L flask equipped with a stirrer, rectifying tube and gas feed tube followed by heating and stirring while raising the temperature at the rate of 10° C. per hour starting at 150° C. in the presence of flowing nitrogen.

The temperature was raised to 220° C. while distilling off the formed water and after 1 hour, 30 ppm of zirconium tetrachloride were added. After 3 hours, 50 ppm of titanium tetrabutoxide monomer were added and the pressure was lowered to 0.1 KPa followed by stirring for 9 hours to obtain aliphatic polyester (A-9) having a number average molecular weight (Mn) as determined by polystyrene conversion using GPC of 19,000, and a weight average molecular weight (Mw) of 33,000.

Reference Example 10—Synthesis of Aliphatic Polyester A-10

100 parts by weight of succinic acid (abbreviated as SuA) and 1.35 mol equivalents of 1,4BG relative to the mol equivalents of dicarboxylic acid were charged into a 1 L flask equipped with a stirrer, rectifying tube and gas feed tube followed by heating and stirring while raising the temperature at the rate of 10° C. per hour starting at 150° C. in the presence of flowing nitrogen.

After raising the temperature to 220° C. while distilling off the formed water, 70 ppm of hafnium tetrachloride were added. After 3 hours, the pressure was lowered to 0.1 KPa followed by stirring for 6 hours to obtain aliphatic polyester (A-10) having a number average molecular weight (Mn) as determined by polystyrene conversion using GPC of 23,000, and a weight average molecular weight (Mw) of 40,000.

Production Example 1—Synthesis of Agent Imparting Impact Resistance C-1

50 parts by weight of aliphatic polyester (A-1) and 50 parts by weight of L-lactide were placed in a separable flask and melted at 180° C. After the molten liquid became uniform, 200 ppm of tin octanoate were added followed by stirring for 3.5 hours at 180° C. Following completion of polymerization, 500 ppm of ethylhexanoic phosphate were added to obtain lactic acid polyester having a number average molecular weight (Mn) as determined by polystyrene conversion using GPC of 25,000, and a weight average molecular weight (Mw) of 50,000 (to be referred to as Agent Imparting Impact Resistance C-1). The $^1$H-NMR chemical shift of Agent Imparting Impact Resistance C-1 is shown in Table 19.

Production Example 2—Synthesis of Agent Imparting Impact Resistance C-2

60 parts by weight of aliphatic polyester (A-1), 40 parts by weight of L-lactide and 15 parts by weight of toluene relative to the total amount of lactide and aliphatic polyester were placed in a separable flask and melted at 180° C. After the molten liquid became uniform, 200 ppm of tin octanoate were added followed by stirring for 4 hours at 180° C. Following completion of polymerization, 5.00 ppm of ethylhexanoic phosphate were added to obtain lactic acid polyester having a number average molecular weight (Mn) as determined by polystyrene conversion using GPC of 18,000, and a weight average molecular weight (Mw) of 35,000 (to be referred to as Agent Imparting Impact Resistance C-2). The melting point of Agent Imparting Impact Resistance C-2 obtained in this manner was 159° C. as determined with a differential scanning calorimeter (DSC).

Production Example 3—Synthesis of Agent Imparting Impact Resistance C-3

80 parts by weight of aliphatic polyester (A-1), 19.2 parts by weight of L-lactide, 0.8 parts by weight of D-lactide and 15 parts by weight of toluene relative to the total amount of lactide and aliphatic polyester were placed in a separable flask and melted at 180° C. After the molten liquid became uniform, 200 ppm of tin octanoate were added followed by stirring for 5 hours at 180° C. Following completion of polymerization, 500 ppm of ethylhexanoic phosphate were added to obtain lactic acid polyester having a number average molecular weight (Mn) as determined by polystyrene conversion using GPC of 10,000, and a weight average molecular weight (Mw) of 21,000 (to be referred to as Agent Imparting Impact Resistance C-3).

Production Example 4—Synthesis of Agent Imparting Impact Resistance C-4

40 parts by weight of aliphatic polyester (A-2), 60 parts by weight of L-lactide and 15 parts by weight of toluene relative to the total amount of lactide and aliphatic polyester were placed in a separable flask and melted at 175° C. After the molten liquid became uniform, 500 ppm of titanium bisacetylacetate were added followed by stirring for 7 hours at 173° C. to obtain lactic acid polyester having a number average molecular weight (Mn) as determined by polystyrene conversion using GPC of 27,000, and a weight average molecular weight (Mw) of 50,000 (to be referred to as Agent Imparting Impact Resistance C-4).

Production Example 5—Synthesis of Agent Imparting Impact Resistance C-5

20 parts by weight of aliphatic polyester (A-3), 80 parts by weight of L-lactide and 15 parts by weight of toluene relative to the total amount of lactide and aliphatic polyester were placed in a separable flask and melted at 175° C. After the molten liquid became uniform, 500 ppm of zinc octanoate were added followed by stirring for 4 hours at 175° C.

After temporarily removing the resulting polymer and dissolving in chloroform, 5 parts by weight of acetic anhydride and S parts by weight of pyridine were added followed by stirring for 1 hour at room temperature. After filtering this solution, it was re-precipitated in methanol to obtain lactic acid polyester having a number average molecular weight (Mn) as determined by polystyrene conversion using GPC of 18,000, and a weight average molecular weight (Mw) of 35,000 (to be referred to as Agent Imparting Impact Resistance C-5). The terminal hydroxyl group was confirmed by IR spectroscopy to have been nearly completely eliminated by acetic esterification.

Production Example 6—Synthesis of Agent Imparting Impact Resistance C-6

40 parts by weight of aliphatic polyester (A-4), 60 parts by weight of L-lactide and 15 parts by weight of toluene relative to the total amount of lactide and aliphatic polyester were placed in a separable flask and melted at 175° C. After the molten liquid became uniform, 1000 ppm of zinc octanoate were added followed by stirring for 6 hours at 173° C. Following completion of polymerization, 500 ppm of ethylhexanoic phosphate were added to obtain lactic acid polyester having a number average molecular weight (Mn) as determined by polystyrene conversion using GPC of 44,000, and a weight average molecular weight (Mw) of 95,000 (to be referred to as Agent Imparting Impact Resistance C-6). The $^1$H-NMR chemical shift of Agent Imparting Impact Resistance C-6 is shown in Table 19.

Production Example 7—Synthesis of Agent Imparting Impact Resistance C-7

70 parts by weight of aliphatic\laromatic polyester (A-5), 30 parts by weight of L-lactide and 15 parts by weight of toluene relative to the total amount of lactide and aliphatic polyester were placed in a separable flask and melted at 175° C. After the molten liquid became uniform, 500 ppm of tin octanoate were added followed by stirring for 4 hours at 175° C. to obtain lactic acid polyester having a number average molecular weight (Mn) as determined by polystyrene conversion using GPC of 28,000, and a weight average molecular weight (Mw) of 53,000 (to be referred to as Agent Imparting Impact Resistance C-7).

Production Example 8—Synthesis of Agent Imparting Impact Resistance C-8

90 parts by weight of aliphatic/aromatic polyester (A-5), 9.6 parts by weight of L-lactide, 0.4 parts by weight of D-lactide and 15 parts by weight of toluene relative to the total amount of lactide and aliphatic polyester were placed in a separable flask and melted at 175° C. After the molten liquid became uniform, 500 ppm of titanium tetraisopropoxide were added followed by stirring for 6 hours at 173° C. Following completion of polymerization, 500 ppm of ethylhexanoic phosphate were added to obtain lactic acid polyester having a number average molecular weight (Mn) as determined by polystyrene conversion using GPC of 38,000, and a weight average molecular weight (Mw) of 91,000 (to be referred to as Agent Imparting Impact Resistance C-8).

Production Example 9—Synthesis of Agent Imparting Impact Resistance C-9

50 parts by weight of aliphatic polyester (A-6), 50 parts by weight of L-lactide and 10 parts by weight of toluene relative to the total amount of lactide and aliphatic polyester were placed in a separable flask and melted at 180° C. After the molten liquid became uniform, 300 ppm of tin octanoate were added followed by stirring for 3 hours at 180° C. Following completion of polymerization, 500 ppm of ethylhexanoic phosphate were added and the pressure was reduced to 0.5 kPa followed by stirring for 1.5 hours to distill off the residual lactide and obtain lactic acid polyester having a number average molecular weight (Mn) as determined by polystyrene conversion using GPC of 58,000, and a weight average molecular weight (Mw) of 102,000 (to be referred to as Agent Imparting Impact ResistanceC-9).

Production Example 10—Synthesis of Agent Imparting Impact Resistance C-10

70 parts by weight of aliphatic polyester (A-6), 30 parts by weight of L-lactide and 10 parts by weight of toluene relative to the total amount of lactide and aliphatic polyester were placed in a separable flask and melted at 180° C. After the molten liquid became uniform, 300 ppm of tin octanoate were added followed by stirring for 2.5 hours at 180° C. Following completion of polymerization, 600 ppm of ethylhexanoic phosphate were added and the pressure was reduced to 0.5 kPa followed by stirring for 1 hour to distill off the residual lactide and obtain lactic acid polyester having a number average molecular weight (Mn) as determined by polystyrene conversion using GPC of 42,000, and a weight average molecular weight (Mw) of 78,000 (to be referred to as Agent Imparting Impact Resistance C-10).

Production Example 11—Synthesis of Agent Imparting Impact Resistance C-11

70 parts by weight of aliphatic/aromatic polyester (A-7), 30 parts by weight of L-lactide and 10 parts by weight of toluene relative to the total amount of lactide and aliphatic polyester were placed in a separable flask and melted at 180° C. After the molten liquid became uniform, 300 ppm of tin octanoate were added followed by stirring for 2.5 hours at 180° C. Following completion of polymerization, 400 ppm of ethylhexanoic phosphate were added and the pressure was reduced to 0.5 kPa followed by stirring for 1 hour to distill off the residual lactide and obtain lactic acid polyester having a number average molecular weight (Mn) as determined by polystyrene conversion using GPC of 32,000, and a weight average molecular weight (Mw) of 60,000 (to be referred to as Agent Imparting Impact Resistance C-11).

Production Example 12—Synthesis of Agent Imparting Impact Resistance C-12

80 parts by weight of aliphatic polyester (A-8), 20 parts by weight of L-lactide and 5 parts by weight of toluene relative to the total amount of lactide and aliphatic polyester were placed in a separable flask and melted at 180° C. After the molten liquid became uniform, 250 ppm of tin octanoate were added followed by stirring for 2.5 hours at 180° C. Following completion of polymerization, 1000 ppm of ethylhexanoic phosphate were added and the pressure was reduced to 0.5 kPa followed by stirring for 2 hours to distill off the residual lactide and obtain lactic acid polyester having a number average molecular weight (Mn) as determined by polystyrene conversion using GPC of 30,000, and a weight average molecular weight (Mw) of 57,000 (to be referred to as Agent Imparting Impact Resistance C-12).

Production Example 13—Synthesis of Agent Imparting Impact Resistance C-13

50 parts by weight of aliphatic polyester (A-9) and 50 parts by weight of L-lactide were placed in a separable flask and melted at 180° C. After the molten liquid became uniform, 250 ppm of tin octanoate were added followed by stirring for 2.5 hours at 180° C. Following completion of polymerization, 800 ppm of ethylhexanoic phosphate were added and the pressure was reduced to 0.5 kPa followed by stirring for 1 hour to distill off the residual lactide and obtain lactic acid polyester having a number average molecular weight (Mn) as determined by polystyrene conversion using GPC of 25,000, and a weight average molecular weight (Mw) of 47,000 (to be referred to as Agent Imparting Impact ResistanceC-13).

Production Example 14—Synthesis of Agent Imparting Impact Resistance C-14

50 parts by weight of aliphatic polyester (A-10) and 50 parts by weight of L-lactide were placed in a separable flask and melted at 190° C. After the molten liquid became uniform, 200 ppm of tin octanoate were added followed by stirring for 2.5 hours at 190° C. Following completion of polymerization, 600 ppm of ethylhexanoic phosphate were added and the pressure was reduced to 0.5 kPa followed by stirring for 1.5 hours to distill off the residual lactide and obtain lactic acid polyester having a number average molecular weight (Mn) as determined by polystyrene conversion using GPC of 27,000, and a weight average molecular weight (Mw) of 51,000 (to be referred to as Agent Imparting Impact ResistanceC-14).

Production Example 15—Synthesis of Agent Imparting Impact Resistance C-15

43 parts by weight of aliphatic polyester (A-1) and 57 parts by weight of L-lactic acid were placed in a separable flask and after dehydrating and condensation polymerizing under normal pressure at 150–220° C. and then dehydrating and condensation polymerizing under reduced pressure at 220° C., 100 ppm of titanium tetrabutoxide were added and the pressure was reduced to 0.2 kPa followed by transesterification at 200° C. Following completion of polymerization, 500 ppm of ethylhexanoic phosphate were added and the pressure was reduced to 0.5 kPa followed by stirring for 2 hours to remove the 3 parts by weight of lactide formed by polymerization and obtain lactic acid polyester having a number average molecular weight (Mn) as determined by polystyrene conversion using GPC of 25,000, and a weight average molecular weight (Mw) of 45,000 (to be referred to as Agent Imparting Impact Resistance C-15).

Example 1—Production of Polymer Blend P-1

85 parts by weight of "Lacty" (manufactured by Shimadzu Corporation, weight average molecular weight: 250,000, number average molecular weight: 160,000, polylactic acid (abbreviated as PLA) and 15 parts by weight of agent imparting impact resistance (C-1) were kneaded for 10 minutes while heating at 190° C. using a Laboplast Mill Mixer (manufactured by Toyo Seiki) to obtain a polymer blend (P-1).

Example 2—Production of Polymer Blend P-2

85 parts by weight of PLA and 15 parts by weight of agent imparting impact resistance (C-2) were kneaded while heating at 200° C. using a Laboplast Mill Twin Screw Extruder (manufactured by Toyo Seiki) to obtain a polymer blend (P-2) followed by forming into pellets.

Example 3—Production of Polymer Blend P-3

80 parts by weight of PLA and 20 parts by weight of agent imparting impact resistance (C-3) were kneaded while heating at 200° C. using a Laboplast Mill Mixer (manufactured by Toyo Seiki) to obtain a polymer blend (P-3) followed by forming into pellets with a single screw extruder (manufactured by Yokohama Seiki).

Example 4—Production of Polymer Blend P-4

70 parts by weight of PLA and 30 parts by weight of agent imparting impact resistance (C-4) were melted and stirred in a 20 L reaction tank (manufactured by Kobe Steel Corp.) followed by feeding into a static mixer SMX (manufactured by Sumitomo Heavy Industries, Ltd.) and retaining in the mixer for 30 minutes to obtain polymer blend (P-4) followed by forming into pellets by a twin screw extruder (manufactured by Toshiba Machine Co., Ltd.).

Example 5—Production of Polymer Blend P-5

60 parts by weight of PLA and 40 parts by weight of agent imparting impact resistance (C-5) were melted and stirred in a 20 L reaction tank (manufactured by Kobe Steel Ltd.) followed by feeding into a static mixer SMX (Sumitomo Heavy Industries, Ltd.) and retaining in the mixer for 30 minutes to obtain polymer blend (P-5) followed by forming into pellets by a twin screw extruder (manufactured by Toshiba Machine Co., Ltd.).

Example 6—Production of Polymer Blend P-6

75 parts by weight of PLA and 25 parts by weight of agent imparting impact resistance (C-6) were melted and kneaded with a twin screw extruder (manufactured by Toyo Seiki) to obtain polymer blend (P6) followed by forming into pellets.

Example 7—Production of Polymer Blend P-7

85 parts by weight of PLA and 15 parts by weight of agent imparting impact resistance (C-7) were melted and stirred in a 20 L reaction tank (manufactured by Kobe Steel Corp.) followed by feeding into a static mixer SMX (manufactured by Sumitomo Heavy Industries, Ltd.) and retaining in the mixer for 30 minutes to obtain polymer blend (P-7) followed by forming into pellets by a twin screw extruder (manufactured by Toshiba Machine Co., Ltd.).

Example 8—Production of Polymer Blend P-8

80 parts by weight of "Biopole" (poly-3-hydroxybutyrate manufactured by Monsanto Company, abbreviated as PHB) and 20 parts by weight of agent imparting impact resistance (C-8) were melted and kneaded using a twin screw extruder (manufactured by Toyo Seiki) to obtain polymer blend (P-8) followed by forming into pellets.

Example 9—Production of Polymer Blend P-9

100 parts by weight of PLA and 20 parts by weight of agent imparting impact resistance (C-9) were melted and kneaded while heating at 190° C. using a twin screw extruder (manufactured bu Toyo Seiki) to obtain polymer blend (P-9) followed by forming into pellets.

Example 10—Production of Polymer Blend P-10

100 parts by weight of PLA and 10 parts by weight of agent imparting impact resistance (C-10) were melted and kneaded while heating at 190° C. using a twin screw extruder (manufactured by Toyo Seiki) to obtain polymer blend (P-10) followed by forming into pellets.

Example 11—Production of Polymer Blend P-11

100 parts by weight of PLA and 10 parts by weight of agent imparting impact resistance (C-11) were melted and kneaded while heating at 190° C. using a Laboplast Mill (manufactured by Toyo Seiki) to obtain polymer blend (P-11).

Example 12—Production of Polymer Blend P-12

100 parts by weight of PLA and 10 parts by weight of agent imparting impact resistance (C-12) were melted and kneaded while heating at 190° C. using a Laboplast Mill (manufactured by Toyo Seiki) to obtain polymer blend (P-12).

Example 13—Production of Polymer Blend P-13

100 parts by weight of PLA and 20 parts by weight of agent imparting impact resistance (C-13) were melted and kneaded while heating at 190° C. using a Laboplast Mill (manufactured by Toyo Seiki) to obtain polymer blend (P-13).

Example 14—Production of Polymer Blend P-14

100 parts by weight of PLA and 30 parts by weight of agent imparting impact resistance (C-14) were melted and kneaded while heating at 195° C. using a Laboplast Mill (manufactured by Toyo Seiki) to obtain polymer blend (P-14).

Example 15—Production of Polymer Blend P-15

100 parts by weight of PLA and 19 parts by weight of agent imparting impact resistance (C-15) were melted and kneaded while heating at 195° C. using a Laboplast Mill (manufactured by Toyo Seiki) to obtain polymer blend (P-15).

Comparative Example 1—Production of Polymer Blend 80 parts by weight of PLA and 20 parts by weight of aliphatic polyester having a weight average molecular weight of 3,000 synthesized from propylene glycol and adipic acid (AA) were kneaded for 10 minutes while heating at 190° C. using a Laboplast Mill Mixer (manufactured by Toyo Seiki) to obtain a polymer blend.

Comparative Example 2—Production of Polymer Blend 80 parts by weight of PLA and 20 parts by weight of aliphatic polyester having a weight average molecular weight of 35,000 synthesized from propylene glycol and adipic acid (AA) were kneaded for 10 minutes while heating at 190° C. using a Laboplast Mill Mixer (manufactured by Toyo Seiki) to obtain a polymer blend.

Comparative Example 3—Production of Polymer Blend 80 parts by weight of PLA and 20 parts by weight of polycaprolactone having a weight average molecular weight of 10,000 were kneaded for 10 minutes while heating at 190° C. using a Laboplast Mill Mixer (manufactured by Toyo Seiki) to obtain a polymer blend.

Comparative Example 4—Production of Polymer Blend 80 parts by weight of PLA and 20 parts by weight of aliphatic polyester having a weight average molecular weight of 18,000 synthesized from PG and SeA were kneaded for 10 minutes while heating at 190° C. using a Laboplast Mill Mixer (manufactured by Toyo Seiki) to obtain a blend.

Comparative Example 5—Physical Properties of Polyhydroxy Carboxylic Acid

The glass transition temperature of PLA was 60° C., the melting point was 175° C., the storage modulus of elasticity at 20° C. in DMA was 3.5 GPa, the Izod impact strength was 2 $KJ/m^2$, haze of a 0 μm film was 2%, and Dupont impact strength was 0.10 J.

Comparative Example 6—Physical Properties of Polyhydroxy Carboxylic Acid

The glass transition temperature of PHB was 48° C., the melting point was 168° C., the storage modulus of elasticity at 20° C. in DMA was 2.9 GPa, the Izod impact strength was 4.3 KJ/m², haze of a 0 μm film was 95%, and Dupont impact strength was 0.16 J.

Comparative Example 7—Physical Properties of Polyhydroxy Carboxylic Acid 50 parts by weight of L-lactic acid, 8 parts by weight of PG and 42 parts by weight of DA were placed in a separable flask and after dehydrating and condensation polymerizing under normal pressure at 150–220° C. and then dehydrating and condensation polymerizing under reduced pressure at 220° C., 100 ppm of titanium tetrabutoxide were added followed by transesterification at 200° C. under reduced pressure. Following completion of polymerization, 500 ppm of ethylhexanoic phosphate were added and the pressure was reduced to 0.5 kPa followed by stirring for 1 hour to remove the 2 parts by weight of lactide formed by polymerization.

The 19 parts by weight of aliphatic polyester having a weight average molecular weight of 39,000 obtained in this manner and 80 parts by weight of PLA were kneaded for 10 minutes while heating at 190° C. using a Laboplast Mill Mixer (manufactured by Toyo Seiki) to obtain a blend.

Test Example 1—Evaluation of Polymer Blends

Glass transition temperature, melting point, storage modulus of elasticity at 20° C. in DMA and Izod impact strength were measured for each of the polymer blends obtained in Examples 1 through 15 and Comparative Examples 1 through 7. Those results are shown in Tables 11 through 18.

Test Example 2—Dupont Impact Strength Haze and Number of Days Until Start of Bleedout of Film Each of the polymer blends obtained in Examples 1 through 15 and Comparative Examples 1 through 7 were dried by heating under reduced pressure for 6 hours at 100° C. 3.3 g of polymer and PET film having a thickness of 250 μm from which a 10×10 μcm square was gouged out were sandwiched between PET film having a thickness of 100 μm, and pressed for 1 minute at a pressure of 200 kg/cm² while heating and melting at 190° C. The resulting film was applied to a water-cooled press for 10 minutes, removed and then allowed to stand at room temperature for 24 hours. The Dupont impact strength and haze of the resulting film measuring 10 cm×10 cm and having a thickness of 250 μm were measured. Those results are shown in Tables 11 through 18.

In addition, each of the lactic acid polyester films obtained above were allowed to stand in a constant temperature and constant humidity bath (PR-2, manufactured by TABAI ESPEC CORP.) held to a humidity of 80%. The status of the film was observed daily, and evaluated in terms of the number of days until bleedout started. Those results are shown in Tables 11 through 18.

Test Example 3—Film Biodegradability Test

Each of the polymer blends obtained in Examples 1 through 15 among the lactic acid polyester films obtained in the above Test Example 2 were sandwiched between metal mesh and allowed to stand in a motorized composting apparatus held to 45° C. Stirring was performed every few hours to prevent the formation of an anaerobic environment. When the film was removed from the apparatus after 30 days, it was shredded into pieces and hardly retained its original shape. After 60 days, the film had disappeared and was unable to be confirmed.

Test Example 4—Evaluation of Biaxially Oriented Film

After pressing each of the polymer blends obtained in Examples 9 through 15 and Comparative Examples 1 through 7 for 3 minutes under conditions of 195° C. and 5 MPa using a compact heated press, the polymer blends were cooled rapidly to produce 900 μm films (measuring 12 cm high×12 cm across) followed by drawing in the vertical direction and horizontal direction by a drawing factor of 2.5 by successively drawing at a chuck interval of 10 cm, drawing temperature conditions of 70° C. and drawing rate of 10 mm/second using a biaxial orientation apparatus (Iwamoto Seisakusbo Ltd.) to obtain biaxially oriented films having a thickness of about 150 μm. The Dupont impact strength and haze of the biaxially oriented films obtained in this manner were then measured. Those results are shown in Tables 14 through 18.

Test Example 5—Production of Biaxially Oriented Heat Set Film

After pressing the polymer blends for 3 minutes under conditions of 195° C. and 5 MPa using a compact heated press, the polymer blends were cooled rapidly to produce 200 μm films (measuring 12 cm high×12 cm across) followed by drawing in the vertical direction and horizontal direction by a drawing factor of 2.5 by successively drawing at a chuck interval of 10 cm, drawing temperature conditions of 60C and drawing rate of 10 mm/second using a Biaxial Orientation Apparatus (Iwamoto Seisakusho Ltd.), and then heat setting for 50 seconds at 140° C. in an air oven to obtain biaxially oriented heat set films having a thickness of about 35 μm. The biaxially oriented heat set films obtained in this manner were then measured for Dupont impact strength and haze. Those results are shown in Tables 14 through 18.

TABLE 1

|  |  | Reference Example 1 | Reference Example 2 | Reference Example 3 |
|---|---|---|---|---|
| Diol component | Glycol | PG | 1,4 BG | PG |
| Dicarboxylic acid component | Dicarboxylic acid | DA | DAH | DA |
| Polyester | Mw (×10,000) | 3.0 | 2.2 | 0.5 |
|  | Mn (×10,000) | 1.8 | 1.3 | 0.2 |
|  | Name of polyester | A-1 | A-2 | A-3 |

TABLE 2

|  |  | Reference Example 4 | Reference Example 5 |
|---|---|---|---|
| Diol component | Glycol | EG<br>1,6 HD | DDO<br>EG |
|  | Composite ratio (mol) | 50/50 | 70/30 |
| Dicarboxylic acid component | Dicarboxylic acid | DA<br>CHDA | CHDA<br>TPA |
|  | Composite ratio (weight) | 66/34 | 70/30 |
| Additive Polyester | | HMDI | PMDA |
|  | Mw (×10,000) | 5.5 | 8.1 |
|  | Mn (×10,000) | 2.5 | 3.6 |
|  | Name of polyester | A-4 | A-5 |

TABLE 3

|  |  | Reference Example 6 | Reference Example 7 | Reference Example 8 |
|---|---|---|---|---|
| Diol component | Glycol | PG | PG | 1,3 BG |
| Dicarboxylic acid component | Dicarboxylic acid | SeA | SeA TPA | SeA |
|  | Composite ratio (mol) |  | 70/30 |  |
| Polyester | Mw (×10,000) | 7.8 | 5.5 | 5.6 |
|  | Mn (×10,000) | 4.1 | 3.0 | 3.1 |
|  | Name of polyester | A-6 | A-7 | A-8 |

TABLE 4

|  |  | Reference Example 9 | Reference Example 10 |
|---|---|---|---|
| Diol component | Glycol | 1,3 BG | 1,4 BG |
| Dicarboxylic acid component | Dicarboxylic acid | AA | SuA |
| Polyester | Mw (×10,000) | 3.3 | 4.0 |
|  | Mn (×10,000) | 1.9 | 2.3 |
|  | Name of polyester | A-9 | A-10 |

TABLE 5

|  |  | Production Example 1 | Production Example 2 | Production Example 3 |
|---|---|---|---|---|
| Polyester | Polyester used | A-1 | A-1 | A-1 |
|  | Charged amount (weight) | 50 | 50 | 50 |
| Lactide | L/D | 100/0 | 100/0 | 96/4 |
|  | Charged amount (weight) | 50 | 40 | 20 |
| Agent imparting impact resistance | Polymer name | C-1 | C-2 | C-3 |
|  | Mw (×10,000) | 5.0 | 3.5 | 2.1 |
|  | Mn (×10,000) | 2.5 | 1.8 | 1.0 |
|  | Tg (° C.) | 53 | 52 | 52 |
|  | mp (° C.) | 168 | 167 | 166 |
|  | Storage modulus of elasticity E' (GPa) 20° C. | 1.3 | 1.1 | 0.5 |

TABLE 6

|  |  | Production Example 4 | Production Example 5 |
|---|---|---|---|
| Polyester | Polyester used | A-2 | A-3 |
|  | Charged amount (weight) | 40 | 20 |
| Lactide | L/D | 100/0 | 100/0 |
|  | Charged amount (weight) | 60 | 80 |
| Agent imparting impact resistance | Polymer name | C-4 | C-5 |
|  | Mw (×10,000) | 5.0 | 3.5 |
|  | Mn (×10,000) | 2.7 | 1.8 |
|  | Tg (° C.) | 57 | 58 |
|  | mp (° C.) | 168 | 169 |
|  | Storage modulus of elasticity E' (GPa) 20° C. | 1.5 | 2.0 |

TABLE 7

|  |  | Production Example 6 | Production Example 7 | Production Example 8 |
|---|---|---|---|---|
| Polyester | Polyester used | A-4 | A-5 | A-6 |
|  | Charged amount (weight) | 40 | 70 | 90 |
| Lactide | L/D | 100/0 | 100/0 | 96/4 |
|  | Charged amount (weight) | 60 | 30 | 10 |
| Agent imparting impact resistance | Polymer name | C-6 | C-7 | C-8 |
|  | Mw (×10,000) | 9.5 | 5.3 | 9.1 |
|  | Mn (×10,000) | 4.4 | 2.8 | 3.8 |
|  | Tg (° C.) | 56 | 52 | 49 |
|  | mp (° C.) | 169 | — | — |
|  | Storage modulus of elasticity E' (GPa) 20° C. | 1.5 | 1.2 | 0.9 |

TABLE 8

|  |  | Production Example 9 | Production Example 10 | Production Example 11 |
|---|---|---|---|---|
| Polyester | Polyester used | A-6 | A-6 | A-7 |
|  | Charged amount (weight) | 50 | 70 | 70 |
| Lactide | L/D | 100/0 | 100/0 | 100/0 |
|  | Charged amount (weight) | 50 | 30 | 30 |
| Agent imparting impact resistance | Polymer name | C-9 | C-10 | C-11 |
|  | Mw (×10,000) | 10.2 | 7.8 | 6.0 |
|  | Mn (×10,000) | 5.8 | 4.2 | 3.2 |
|  | Tg (° C.) | 53 | 54 | 55 |
|  | mp (° C.) | 168 | 162 | 164 |
|  | Storage modulus of elasticity E' (GPa) 20° C. | 0.8 | 0.3 | 0.5 |

TABLE 9

|  |  | Production Example 12 | Production Example 13 | Production Example 14 |
|---|---|---|---|---|
| Polyester | Polyester used | A-8 | A-9 | A-10 |
|  | Charged amount (weight) | 80 | 50 | 50 |
| Lactide | L/D | 100/0 | 100/0 | 100/0 |
|  | Charged amount (weight) | 20 | 50 | 50 |
| Agent imparting impact resistance | Polymer name | C-12 | C-13 | C-14 |
|  | Mw (×10,000) | 5.7 | 4.7 | 5.1 |
|  | Mn (×10,000) | 3.0 | 2.5 | 2.7 |
|  | Tg (° C.) | 51 | 55 | 57 |
|  | mp (° C.) | 157 | 167 | 169 |
|  | Storage modulus of elasticity E' (GPa) 20° C. | 0.2 | 0.5 | 1.5 |

TABLE 10

|  |  | Production Example 15 |
|---|---|---|
| Polyester | Polyester used | A-1 |
|  | Charged amount (weight) | 43 |
| Lactic acid | L/D | 100/0 |
|  | Charged amount (weight) | 57 |
| Agent imparting impact resistance | Polymer name | C-15 |
|  | Mw (×10,000) | 4.5 |
|  | Mn (×10,000) | 2.5 |
|  | Tg (° C.) | 53 |
|  | mp (° C.) | 168 |
|  | Storage modulus of elasticity E' (GPa) 20° C. | 1.3 |

TABLE 11

|  |  | Example 1 | Example 2 | Example 3 |
|---|---|---|---|---|
| Polymer | Polyester used | PLA | PLA | PLA |
|  | Molecular weight (Mw/Mn) (× 10,000) | 25/16 | 25/16 | 25/16 |
|  | Charged amount (parts by weight) | 85 | 85 | 80 |
| Agent imparting impact resistance | Polymer name | C-1 | C-2 | C-3 |
|  | Amount charged (parts by weight) | 15 | 15 | 20 |
| Polymer blend | Blend name | P-1 | P-2 | P-3 |
|  | Tg (° C.) | 57 | 55 | 58 |
|  | mp (° C.) | 170 | 171 | 172 |
|  | Storage modulus of elasticity (GPa) 20° C. | 1.5 | 1.1 | 0.9 |
|  | Izod impact strength (KJ/m$^2$) | 15 | 12 | 17 |
| 250 µm film | Haze (%) | 10 | 12 | 15 |
|  | Dupont impact strength (J) | 0.31 | 0.30 | 0.33 |
|  | Number of days until start of bleedout | 1 year or more | 200 days | 1 year or more |

TABLE 12

|  |  | Example 4 | Example 5 |
|---|---|---|---|
| Polymer | Polyester used | PLA | PLA |
|  | Molecular weight (Mw/Mn) (× 10,000) | 25/16 | 25/16 |
|  | Charged amount (parts by weight) | 70 | 60 |
| Agent imparting impact resistance | Polymer name | C-4 | C-5 |
|  | Amount charged (parts by weight) | 30 | 40 |
| Polymer blend | Blend name | P-4 | P-5 |
|  | Tg (° C.) | 57 | 50 |
|  | mp (° C.) | 172 | 165 |
|  | Storage modulus of elasticity (GPa) 20° C. | 0.5 | 0.3 |
|  | Izod impact strength (KJ/m$^2$) | 45 | No breakage |
| 250 µm film | Haze (%) | 17 | 22 |
|  | Dupont impact strength (J) | 0.92 | 1.01 |
|  | Number of days until start of bleedout | 1 year or more | 250 days |

TABLE 13

|  |  | Example 6 | Example 7 | Example 8 |
|---|---|---|---|---|
| Polymer | Polyester used | PLA | PLA | PHB |
|  | Molecular weight (Mw/Mn) (× 10,000) | 25/16 | 25/16 | — |
|  | Charged amount (parts by weight) | 75 | 85 | 80 |
| Agent imparting impact resistance | Polymer name | C-6 | C-7 | C-8 |
|  | Amount charged (parts by weight) | 25 | 15 | 20 |
| Polymer blend | Blend name | P-6 | P-7 | P-8 |
|  | Tg (° C.) | 57 | 57 | 50 |
|  | mp (° C.) | 152 | 154 | 168 |
|  | Storage modulus of elasticity (GPa) 20° C. | 0.7 | 1.3 | 1.5 |
|  | Izod impact strength (KJ/m$^2$) | 35.1 | 12.7 | 13.0 |
| 250 µm film | Haze (%) | 19 | 13 | 90 |
|  | Dupont impact strength (J) | 0.50 | 0.41 | 0.40 |
|  | Number of days until start of bleedout | 1 year or more | 1 year or more | 1 year or more |

TABLE 14

|  |  | Example 9 | Example 10 | Example 11 |
|---|---|---|---|---|
| Polymer | Polyester used | PLA | PLA | PLA |
|  | Molecular weight (Mw/Mn) (× 10,000) | 25/16 | 25/16 | 25/16 |
|  | Charged amount (parts by weight) | 100 | 100 | 100 |
| Agent imparting impact resistance | Polymer name | C-9 | C-10 | C-11 |
|  | Amount charged (parts by weight) | 20 | 10 | 10 |
| Polymer blend | Blend name | P-9 | P-10 | P-11 |
|  | Tg (° C.) | 52 | 53 | 54 |
|  | mp (° C.) | 171 | 172 | 170 |
|  | Storage modulus of elasticity (GPa) 20° C. | 1.8 | 2.2 | 2.4 |
|  | Izod impact strength (KJ/m$^2$) | 10.0 | 15.1 | 14.2 |
| 250 µm film | Haze (%) | 9 | 9 | 10 |
|  | Dupont impact strength (J) | 0.43 | 0.48 | 0.39 |
|  | Number of days until start of bleedout | 1 year or more | 1 year or more | 1 year or more |

TABLE 14-continued

|  |  | Example 9 | Example 10 | Example 11 |
|---|---|---|---|---|
| 150 μm biaxially oriented film | Haze (%) | 7 | 7 | 8 |
|  | Dupont impact strength (J) | 0.40 | 0.45 | 0.38 |
| 35 μm biaxially oriented heat set film | Haze (%) | 3 | 2 | 3 |
|  | Film impact (J) | 1.6 | 1.7 | 2.5 |

TABLE 15

|  |  | Example 12 | Example 13 | Example 14 |
|---|---|---|---|---|
| Polymer | Polyester used | PLA | PLA | PLA |
|  | Molecular weight (Mw/Mn) (× 10,000) | 25/16 | 25/16 | 25/16 |
|  | Charged amount (parts by weight) | 100 | 100 | 100 |
| Agent imparting impact resistance | Polymer name | C-12 | C-13 | C-14 |
|  | Amount charged (parts by weight) | 10 | 20 | 30 |
| Polymer blend | Blend name | P-12 | P-13 | P-14 |
|  | Tg (° C.) | 51 | 50 | 50 |
|  | mp (° C.) | 168 | 168 | 169 |
|  | Storage modulus of elasticity (GPa) 20° C. | 2.3 | 1.6 | 2.1 |
|  | Izod impact strength (KJ/m²) | 12.0 | 9.1 | 10.0 |
| 250 μm film | Haze (%) | 8 | 3 | 27 |
|  | Dupont impact strength (J) | 0.41 | 0.50 | 0.62 |
|  | Number of days until start of bleedout | 1 year or more | 1 year or more | 1 year or more |
| 150 μm biaxially oriented film | Haze (%) | 7 | 2 | 20 |
|  | Dupont impact strength (J) | 0.39 | 0.50 | 0.61 |
| 35 μm biaxially oriented heat set film | Haze (%) | 3 | 1 | 10 |
|  | Film impact (J) | 1.7 | 2.2 | 2.5 |

TABLE 16

|  |  | Example 15 |
|---|---|---|
| Polymer | Polyester used | PLA |
|  | Molecular weight (Mw/Mn) (×10,000) | 25/16 |
|  | Charged amount (parts by weight) | 100 |
| Agent imparting impact resistance | Polymer name | C-15 |
|  | Amount charged (parts by weight) | 19 |
| Polymer blend | Blend name | P-15 |
|  | Tg (° C.) | 50 |
|  | mp (° C.) | 167 |
|  | Storage modulus of elasticity (GPa) 20° C. | 2.6 |
|  | Izod impact strength (KJ/m²) | 9.0 |
| 250 μm film | Haze (%) | 35 |
|  | Dupont impact strength (J) | 0.19 |
|  | Number of days until start of bleedout | 70 days |

TABLE 16-continued

|  |  | Example 15 |
|---|---|---|
| 150 μm biaxially oriented film | Haze (%) | 30 |
|  | Dupont impact strength (J) | 0.15 |
| 35 μm biaxially oriented heat set film | Haze (%) | 21 |
|  | Film impact (J) | 1.1 |

TABLE 17

|  |  | Comp. Ex. 1 | Comp. Ex. 2 | Comp. Ex. 3 | Comp. Ex. 4 |
|---|---|---|---|---|---|
| Polymer | Polymer name | PLA | PLA | PLA | PLA |
|  | Mw/Mn (× 10,000) | 25/16 | 25/16 | 25/16 | 25/16 |
|  | Charged amount (parts by weight) | 80 | 80 | 80 | 80 |
| Plastici-zer | Structure | PG-AA | PG-AA | PCL | PG-SeA |
|  | Charged amount (parts by weight) | 20 | 20 | 20 | 20 |
|  | Mw (× 10,000) | 0.3 | 3.5 | 1 | 1.8 |
|  | Mn (× 10,000) | 0.2 | 2.2 | 0.8 | 1.2 |
| Polymer blend | Tg (° C.) | 29 | 32 | 40 | 47 |
|  | mp (° C.) | 165 | 166 | 169 | 155 |
|  | Storage modulus of elasticity (GPa) 20° C. | 2.9 | 2.8 | 2.5 | 2.9 |
|  | Izod impact strength (KJ/m²) | 2.5 | 2.6 | 5.5 | 3.0 |
| 250 μm film | Haze (%) | 10 | 10 | 45 | 65 |
|  | Dupont impact strength (J) | 0.10 | 0.13 | 0.12 | 0.12 |
|  | No. of days until start of bleedout | 10 days | 10 days | 60 days | 1 day |
| 150 μm biaxially oriented film | Haze (%) | 9 | 10 | 45 | 59 |
|  | Dupont impact strength (J) | 0.10 | 0.12 | 0.11 | 0.13 |
| 35 μm biaxially oriented heat set film | Haze (%) | 2 | 2 | 12 | 16 |
|  | Film impact (J) | 0.9 | 0.9 | 0.9 | 0.6 |

TABLE 18

|  |  | Comp. Ex. 5 | Comp. Ex. 6 | Comp. Ex. 7 |
|---|---|---|---|---|
| Polymer | Polymer name | PLA | PHB | PLA |
|  | Mw/Mn (× 10,000) | 25/16 | Not measured | 25/16 |
|  | Charged amount (parts by weight) | 100 | 100 | 100 |
| Plasticizer | Structure | — | — | LA-PG-SeA |
|  | Charged amount (parts by weight) | 0 | 0 | 19 |
|  | Mw (×10,000) | — | — | 3.9 |
|  | Mn (×10,000) | — | — | 2.4 |

TABLE 18-continued

|  |  | Comp. Ex. 5 | Comp. Ex. 6 | Comp. Ex. 7 |
|---|---|---|---|---|
| Polymer blend | Tg (° C.) | 60 | 48 | 42 |
|  | mp (° C.) | 175 | 168 | 164 |
|  | Storage modulus of elasticity (GPa) 20° C. | 3.5 | 2.9 | 2.7 |
|  | Izod impact strength (KJ/m$^2$) | 2.0 | 4.3 | 2.5 |
| 250 μm film | Haze (%) | 2.0 | 95 | 52 |
|  | Dupont impact strength (J) | 0.10 | 0.17 | 0.13 |
|  | No. of days until start of bleedout | — | — | 20 days |
| 150 μm biaxially oriented film | Haze (%) | 1.7 | 81 | 39 |
|  | Dupont impact strength (J) | 0.12 | 0.16 | 0.14 |
| 35 μm biaxially oriented heat set film | Haze (%) | 0.4 | 21 | 20 |
|  | Film impact (J) | 0.7 | 0.9 | 0.7 |

TABLE 19

|  |  | Production Example 1 | Production Example 6 |
|---|---|---|---|
| Polyester | Diol | PG | EG<br>1,6 HD |
|  | Chemical shift | 1.25(d)<br>4.21(m)<br>5.05(m) | 1.40(br)<br>2.05(m)<br>4.01(t) |
|  | Mol % | 19.5 | 15.7 |
|  | Dicarboxylic acid | DA | DA<br>CHDA |
|  | Chemical shift | 0.87(br)<br>1.26(br)<br>1.52(br)<br>2.32(t)<br>6.79(m) | 0.5–2.5(br)<br>3.1(br) |
|  | Mol % | 19.5 | 15.7 |
| Polylactic acid | Chemical shift | 1.56(d)<br>5.01(q) | 1.56(d)<br>5.01(q) |
|  | Mol % | 80.5 | 84.3 |
| Polyester/polylactic acid | Weight ratio (measured value) | 51/49 | 39/61 |

Izod impact strength of 9 KJ/m$^2$, and at a maximum, did not break or exhibited an impact resistance value of 40 KJ/m$^2$. In the case of having been added to another polyhydroxy carboxylic acid in the form of polyhydroxybutyrate ("Biopole" manufactured by Monsanto Company), it exhibited an impact strength value of 6 KJ/m$^2$ or more, and even at a maximum, did not break or exhibited a value of 40 KJ/m$^2$ or more.

On the other hand, the comparative examples consisted of kneaded compositions of ordinary plasticizers and polylactic acid, impact resistance was not high, and there were many that were accompanied by decreases in Tg, decreases in storage stability and decreases in transparency. On the basis of these results, the agent imparting impact resistance of the present invention clearly possesses superior performance in comparison with conventional plasticizers.

INDUSTRIAL APPLICABILITY

The agent imparting impact resistance of the present invention is able to increase resistance to bleedout and impart superior flexibility and impact resistance while maintaining transparency by adding to polyhydroxy carboxylic acid. In addition, the polyester composition (VI) of the present invention containing agent imparting impact resistance (IV) and polyhydroxy carboxylic acid (V) has superior transparency, flexibility and impact resistance with minimal bleedout of agent imparting impact resistance (IV). Moreover, a molded article or film composed of the polyester composition (VI) of the present invention each has superior transparency, flexibility and impact resistance with minimal bleedout of agent imparting impact resistance (IV).

What is claimed is:

1. An agent imparting impact resistance for polyhydroxy carboxylic acids comprising a lactic acid polyester (III) having a lactic acid unit (I) and polyester unit (II), comprised of a dicarboxylic acid (A) and a diol (B), at a weight ratio within a range of 10:90 to 90:10, a weight average molecular weight of 10,000 or more, and a glass transition temperature of 60° C. or below, and wherein the diol (B) includes a dimer diol having 20 to 45 carbon atoms.

2. A polyester composition containing a polylactic acid (V) and an agent imparting impact resistance (IV), wherein an agent imparting impact resistance (IV) is composed of a lactic acid polyester (III) which has a lactic acid unit (I) and a polyester component (II) at a weight ratio within the range of 10:90 to 90:10, a weight average molecular weight of 10,000 or more, a glass transition temperature of 60° C. or below, and the lactic acid polyester (III) comprises a block copolymer composed of lactic acid or lactide, and polyester comprising hydroxyl groups on both terminals.

3. The polyester composition according to claim 2, wherein a proportion of the lactic acid polyester (III) and the polylactic acid (V) is within a range of a weight ratio of 3:97 to 70:30.

4. The polyester composition according to claim 2, wherein a storage modulus of elasticity at 20° C. of the lactic acid polyester (III) is 2.5 gigapascals or less.

5. The polyester composition according to claim 2, wherein the weight average molecular weight of the lactic acid polyester (III) is within a range of 20,000 to 200,000.

6. The polyester composition according to claim 2, wherein the weight average molecular weight of the polylactic acid (V) is 50,000 or more.

7. The polyester composition according to claim 2, wherein the glass transition temperature (Tg) of the polyester composition is 50° C. and above.

8. The polyester composition according to claim 2, wherein an impact strength as determined by the Izod impact test method as defined in Japanese Industrial Standard (JIS) K 7110 is 3 kJ/m$^2$ or more.

9. A molded article composed of the polyester composition according to claim 2.

10. A film composed of the polyester composition according to claim 2.

11. The film according to claim 10, obtained by drawing the polyester composition within a temperature range from its glass transition temperature (Tg) to 50° C. above its glass transition (Tg+50)° C.

* * * * *